Figure 1:
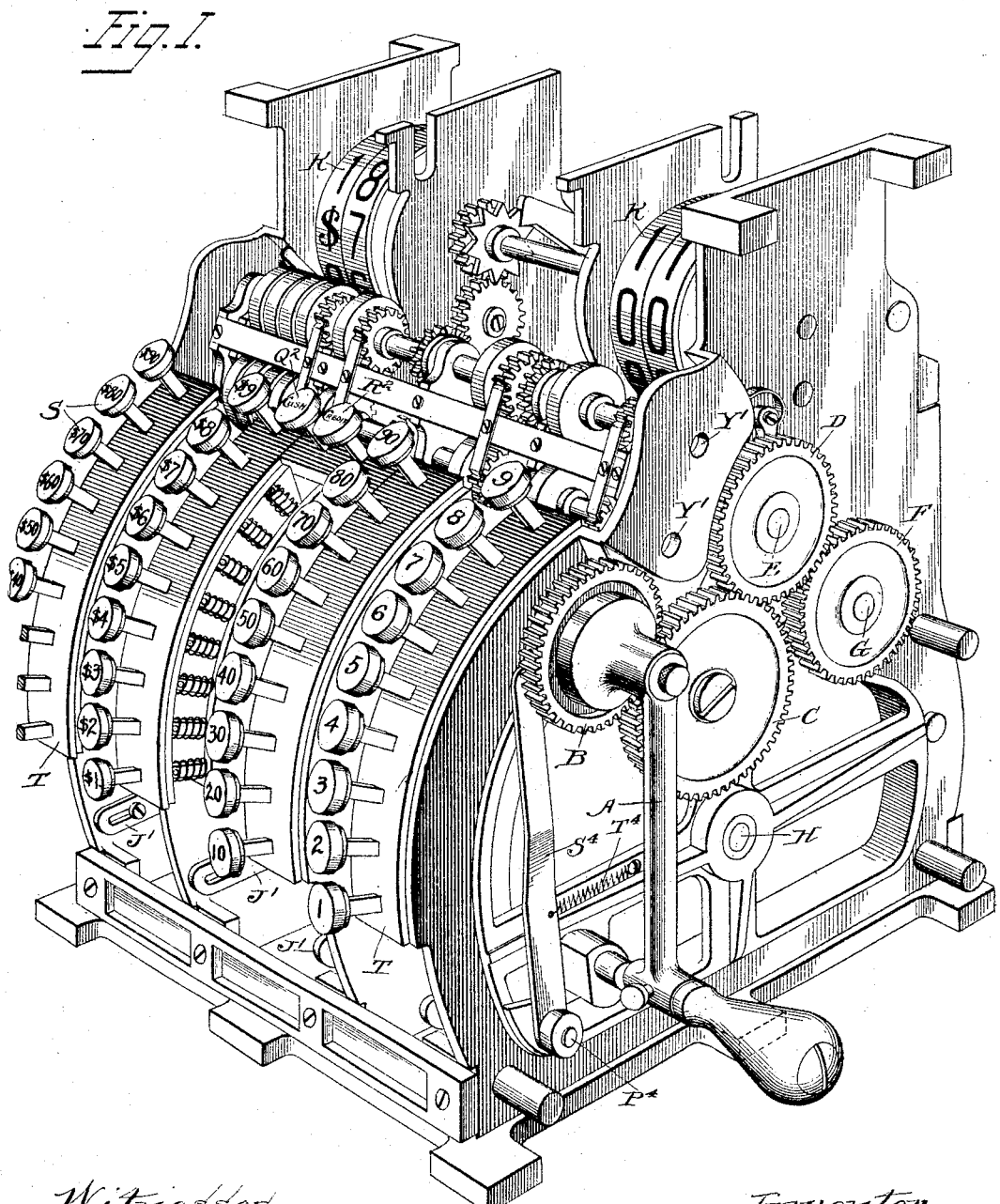

(No Model.) 9 Sheets—Sheet 1.

J. P. CLEAL.
CASH REGISTER AND INDICATOR.

No. 587,298. Patented Aug. 3, 1897.

Witnesses
Martin H. Olsen
Leonora Wiseman

Inventor
Joseph P. Cleal
by Edward Rector
his atty (No Model.) 9 Sheets—Sheet 3.

J. P. CLEAL.
CASH REGISTER AND INDICATOR.

No. 587,298. Patented Aug. 3, 1897.

Witnesses
Martin H. Olsen.
Lenora Wiseman

Inventor
Joseph P. Cleal
by Edward Rector
his atty (No Model.) 9 Sheets—Sheet 5.
J. P. CLEAL.
CASH REGISTER AND INDICATOR.

No. 587,298. Patented Aug. 3, 1897.

Witnesses
Martin H. Olsen.
Leonora Wiseman.

Inventor
Joseph P. Cleal
by Edward Reitor
his atty (No Model.)  
9 Sheets—Sheet 6.

J. P. CLEAL.
CASH REGISTER AND INDICATOR.

No. 587,298.  
Patented Aug. 3, 1897.

Witnesses  
Martin H. Olsen  
Leonora Wiseman

Inventor  
Joseph P. Cleal  
by Edward Rector  
his atty.

(No Model.)
9 Sheets—Sheet 7.

J. P. CLEAL.
CASH REGISTER AND INDICATOR.

No. 587,298.  Patented Aug. 3, 1897.

Witnesses
Martin H. Olsen.
Leonora Wiseman.

Inventor
Joseph P. Cleal
by Edmund Rector
his atty (No Model.) 9 Sheets—Sheet 8.

J. P. CLEAL.
CASH REGISTER AND INDICATOR.

No. 587,298. Patented Aug. 3, 1897.

Witnesses
Martin H. Olsen
Lenora Nieman

Inventor
Joseph P. Cleal
by Edward Rocta
his atty.

(No Model.) 9 Sheets—Sheet 9.
J. P. CLEAL.
CASH REGISTER AND INDICATOR.
No. 587,298. Patented Aug. 3, 1897.
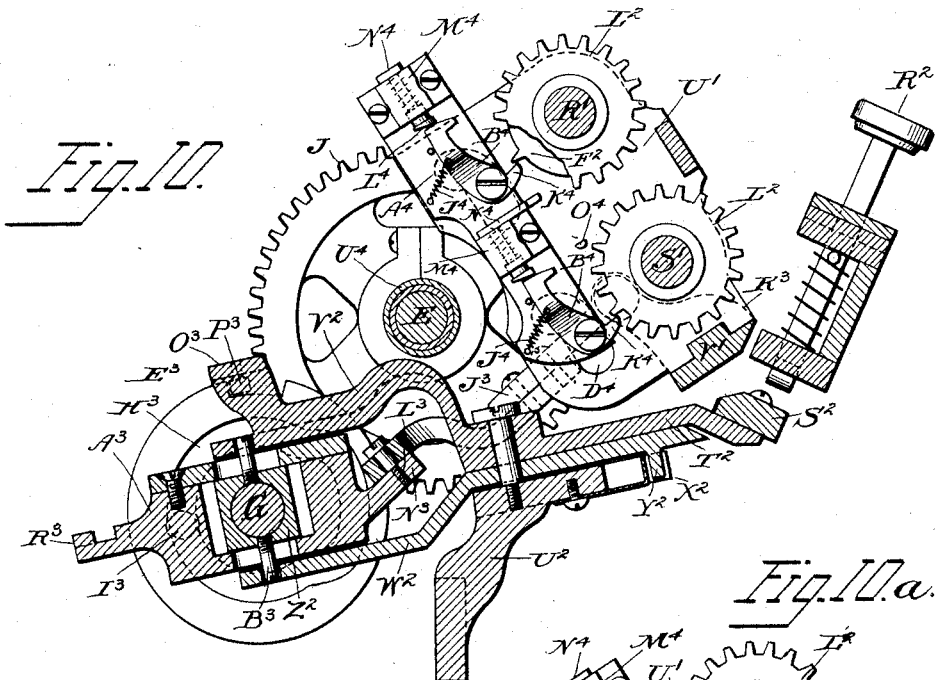
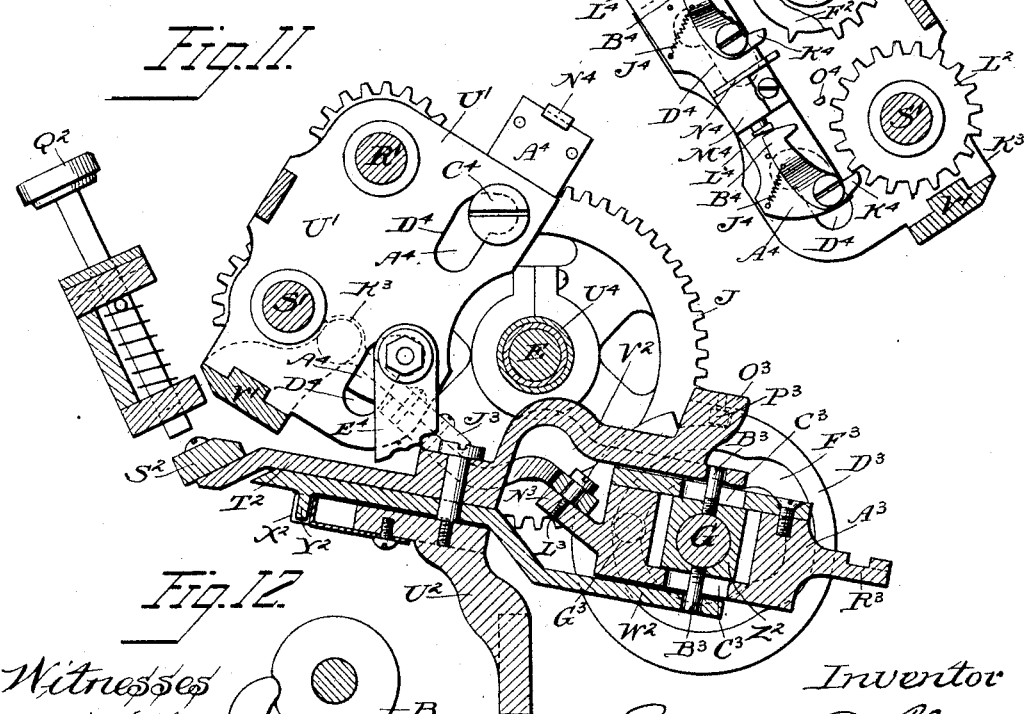
Witnesses
Martin H. Olsen
Leonora Mennan
Inventor
Joseph P. Cleal
by Edward Rector
his atty

UNITED STATES PATENT OFFICE.

JOSEPH P. CLEAL, OF DAYTON, OHIO, ASSIGNOR TO THE NATIONAL CASH REGISTER COMPANY, OF SAME PLACE.

CASH REGISTER AND INDICATOR.

SPECIFICATION forming part of Letters Patent No. 587,298, dated August 3, 1897.

Application filed January 29, 1895. Serial No. 536,516. (No model.)

*To all whom it may concern:*

Be it known that I, JOSEPH P. CLEAL, a citizen of the United States, residing at Dayton, in the county of Montgomery, in the State of Ohio, have invented a certain new and useful Improvement in Cash Registers and Indicators, of which the following is a description, reference being had to the accompanying drawings, forming part of this specification.

My improvement relates more particularly to machines of the general character of that shown and described in Letters Patent of the United States Nos. 464,294, and 483,511, and other subsequent patents, and in the present instance has been illustrated in the drawings and will be described in the specification as an improvement upon such machine. It will be understood, however, from the description which will be given of it that many of its features are not restricted to such machine, but are applicable to other different machines.

The first important feature of my invention consists in the combination of a double register, or two sets of registering-wheels, with the single set, or series of sets, of keys, and the single driving or operating mechanism of the machine, in such manner that the amount to be indicated and registered at any operation of the machine may be added at will upon either one or the other of said registers. Combined with the two registers are two shifter-keys, one adapted to throw one register into operative connection with the driving mechanism and the other adapted to throw the other register into connection with it. For some of the purposes of the invention, however, as will be hereinafter explained, the parts might be so arranged that one of the registers would be normally in connection with the driving mechanism and a single shifter be employed for disconnecting it and throwing the other register into connection with the driving mechanism.

In the present instance an indicator is combined with the two shifter-keys in such manner as to indicate which register is being actuated by the operation of the machine.

The second important feature of my invention consists in the provision of means for printing the amounts of the sales upon loose sales-slips or duplicate slips, such as are used in dry-goods stores and other retail establishments.

The machine upon which my invention is based was provided with a printing attachment, by means of which the amount of each sale was printed upon a record-strip carried within the machine and automatically advanced at each operation, and also upon a check-strip, from which latter the printed check was severed and delivered from the machine. I have dispensed with the check-strip mechanism and substituted therefor means for supporting and automatically advancing to the printing-point and printing at each operation a loose sales-slip of the character before mentioned, or two or more of such slips with carbon-sheets between them, whereby the amount of the sale may be printed upon one and duplicated upon the others.

Besides these two principal features my invention relates to various other improvements upon and modifications of the various mechanisms of the machine in question; and it consists in the novel constructions, combinations, modes of operation, and arrangements of parts, which will be hereinafter described, and particularly pointed out in the claims.

Figure 2:
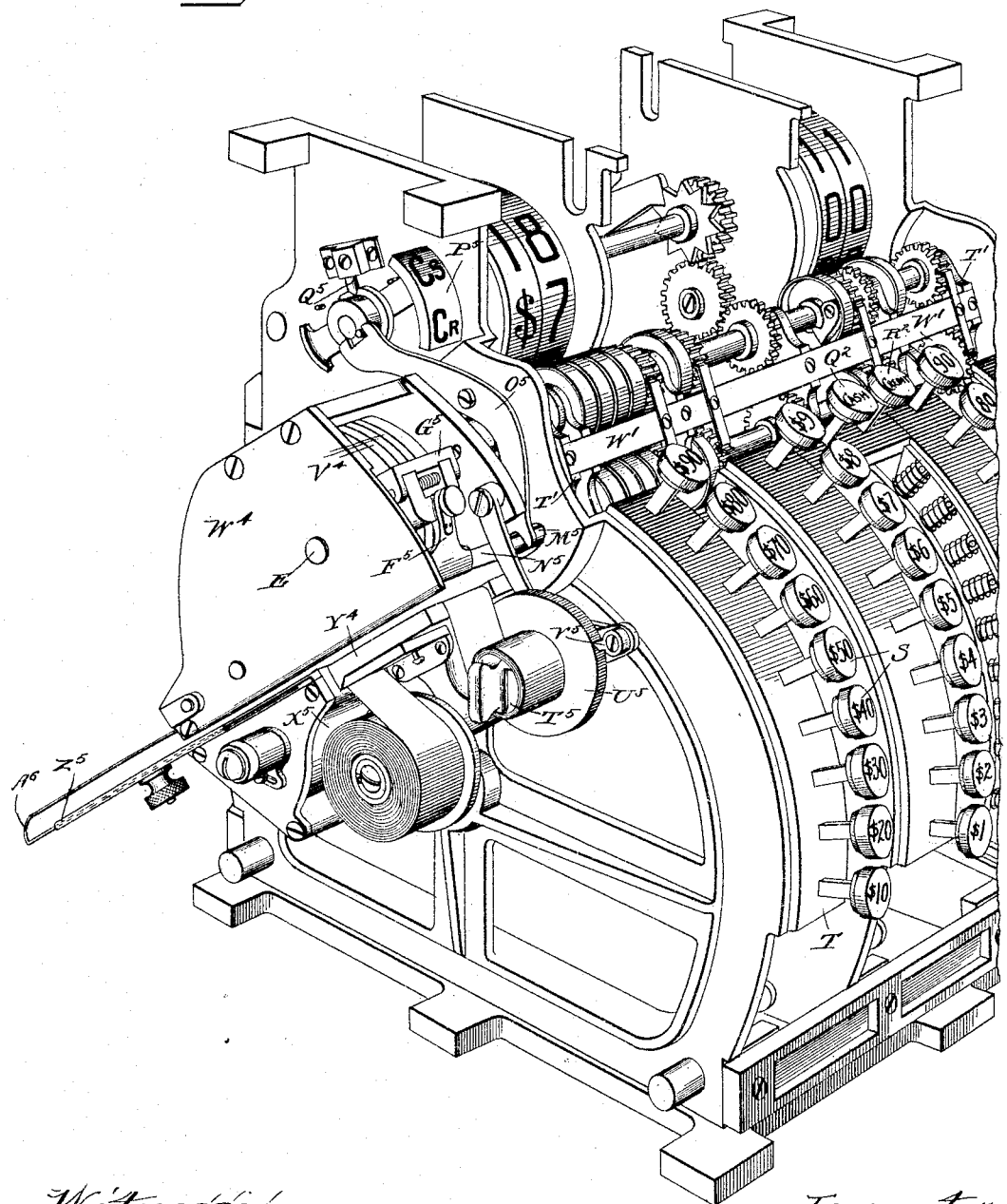
Figure 3:
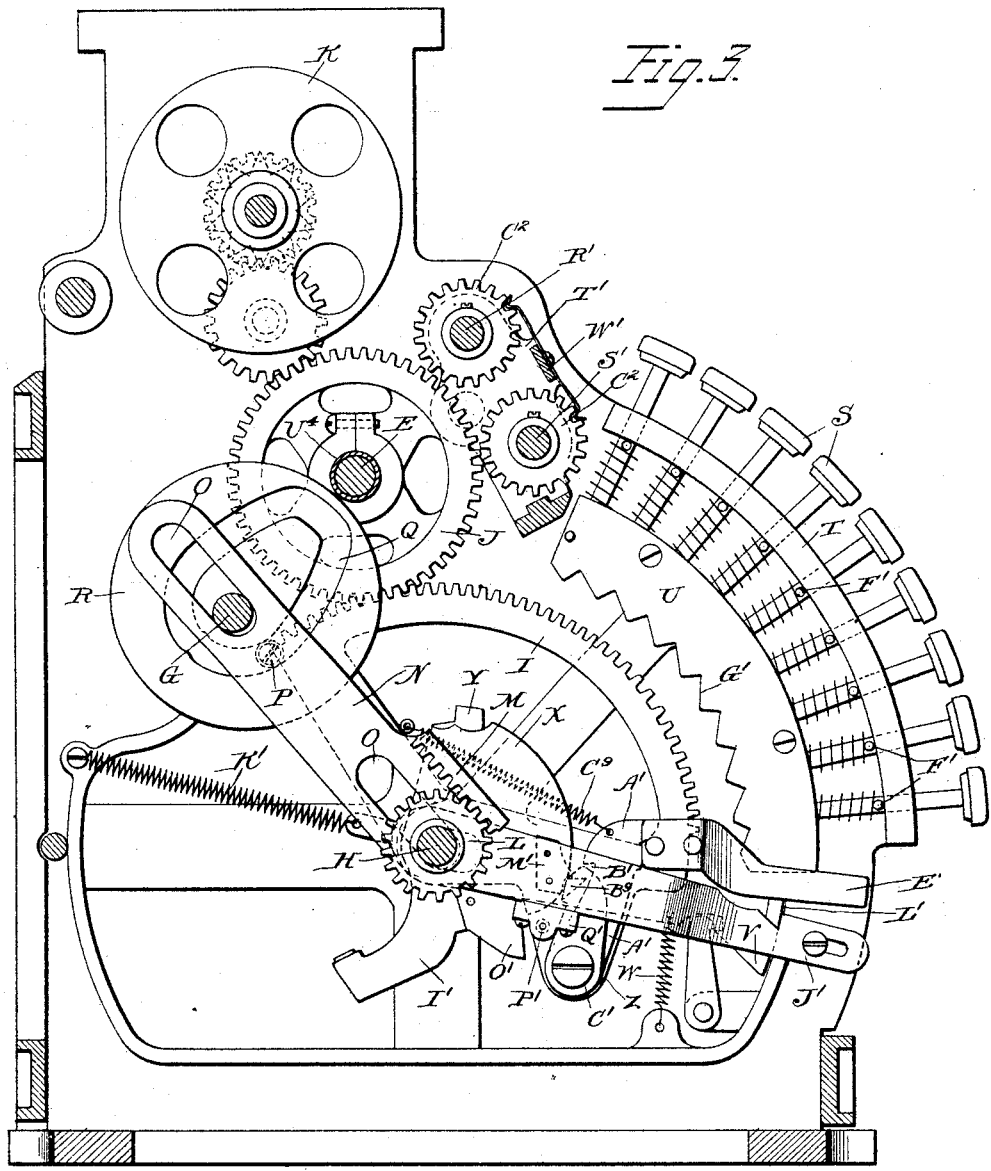
Figure 4:
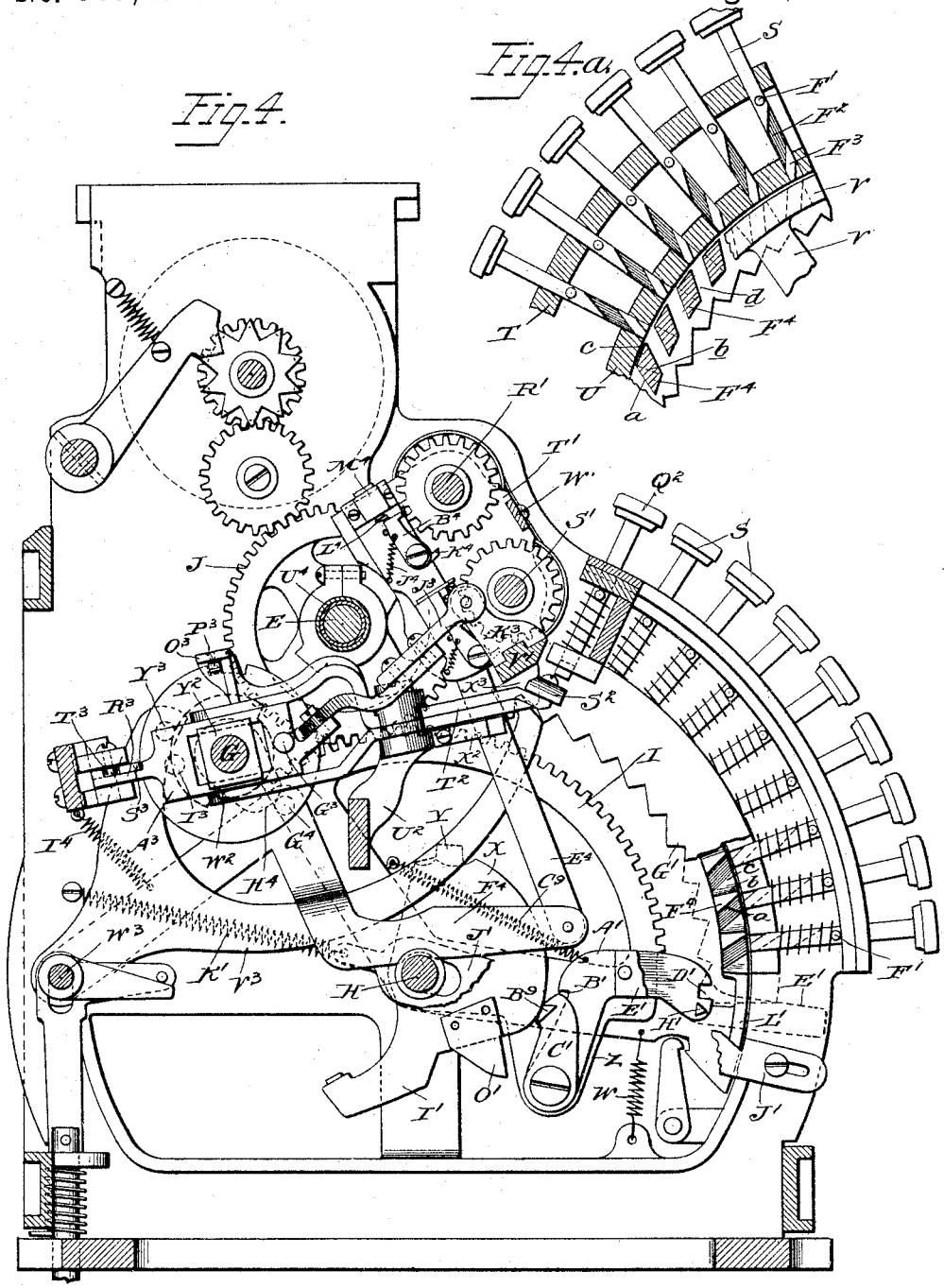
Figure 5:
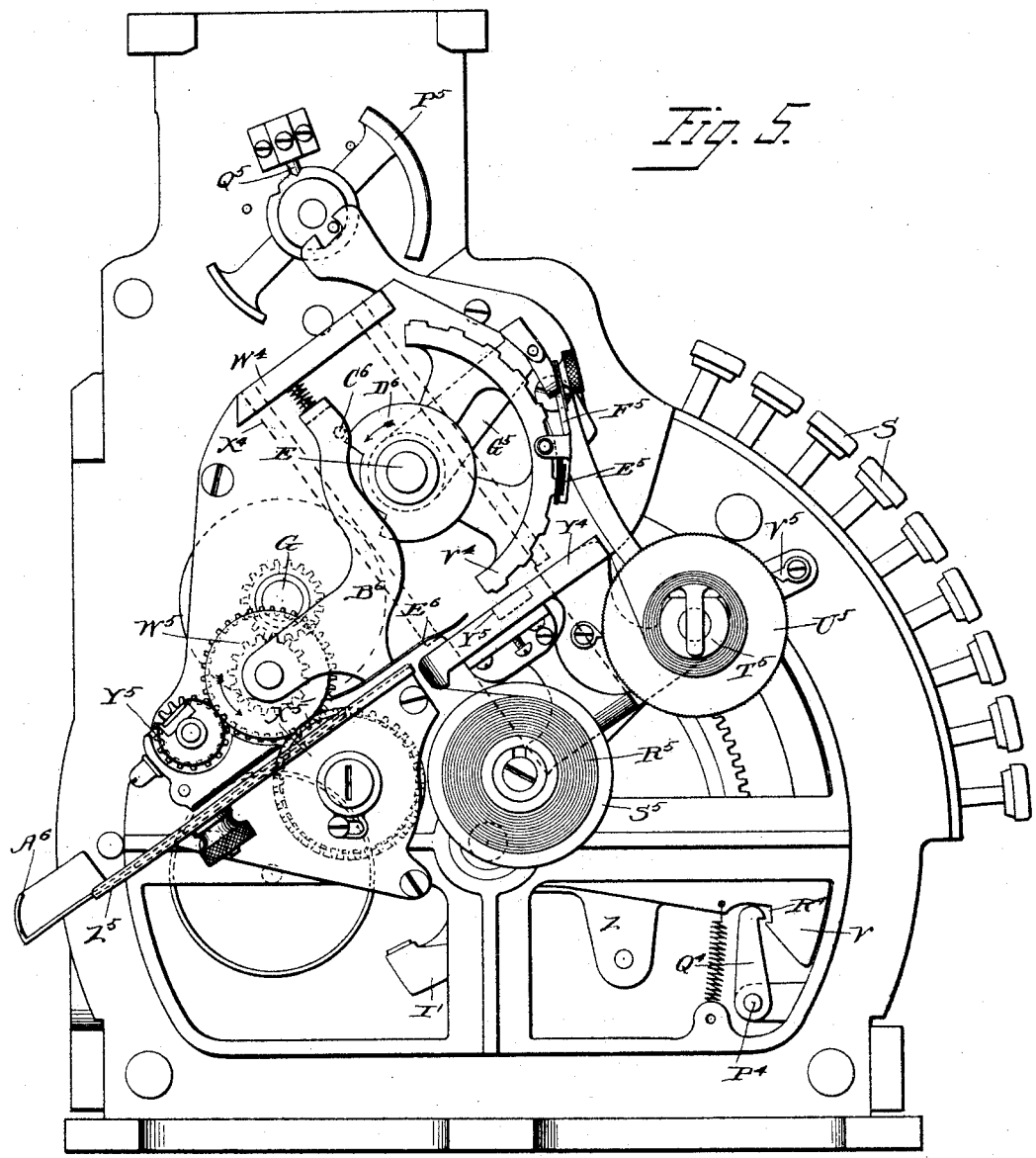
Figure 6:
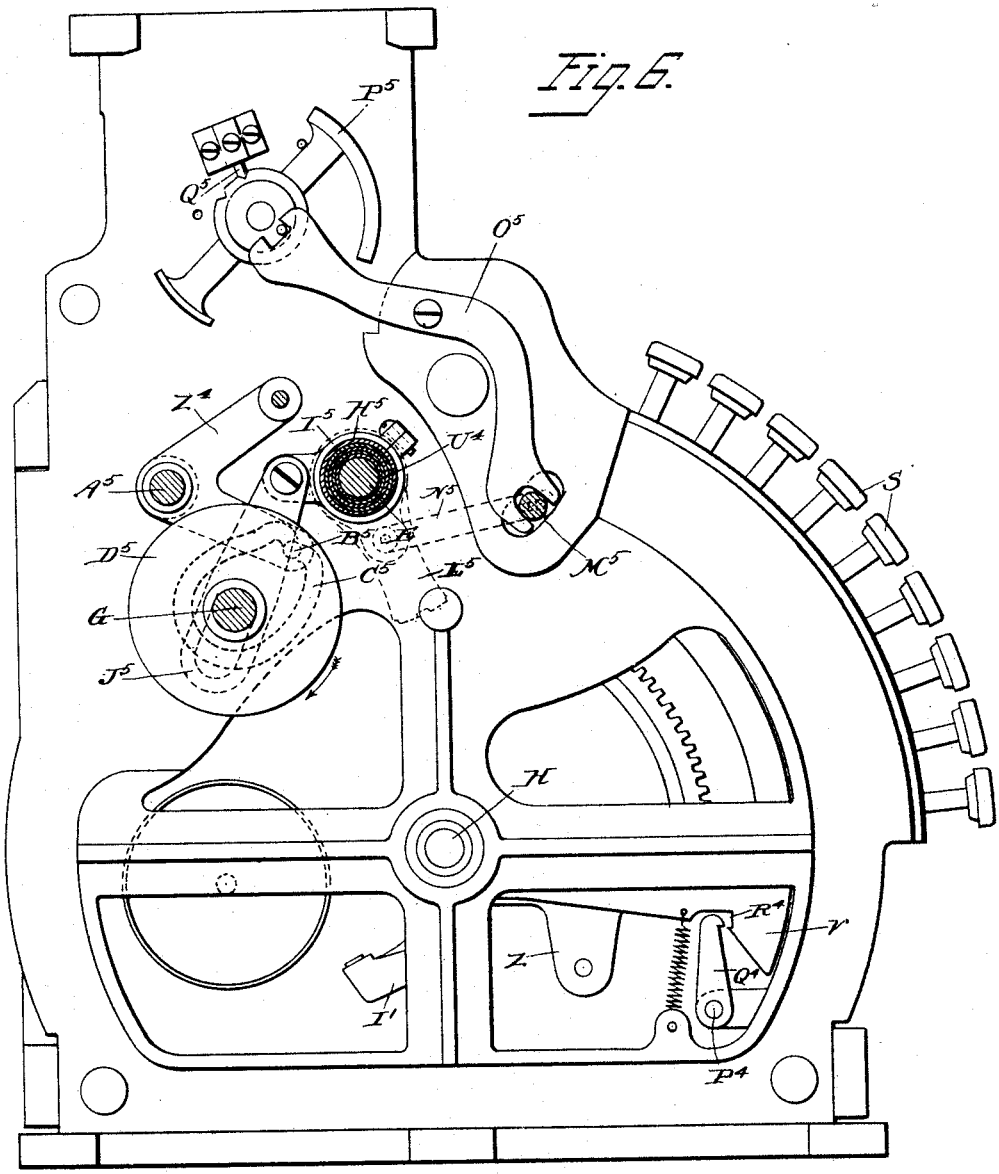
Figure 7:
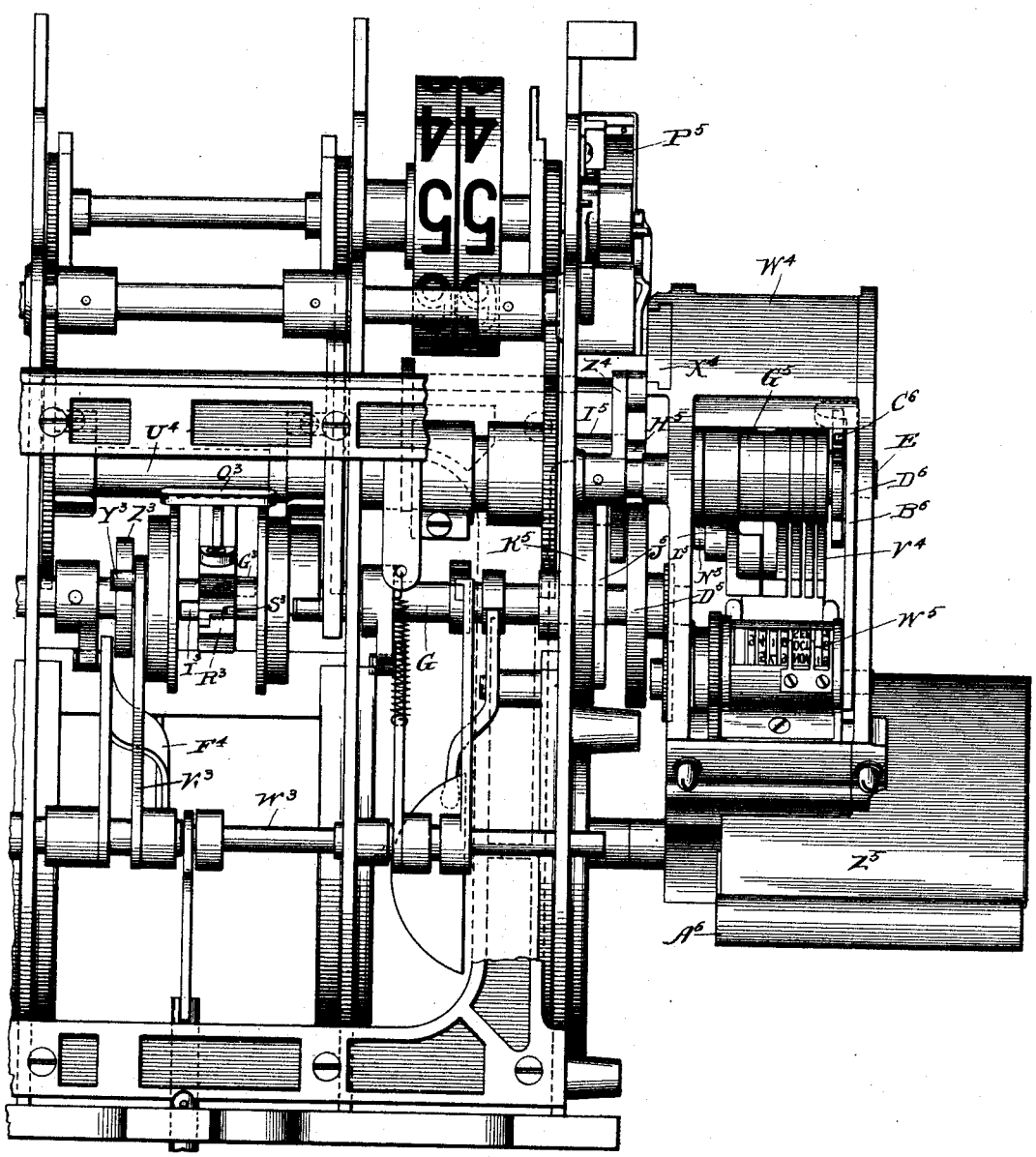
Figure 8:
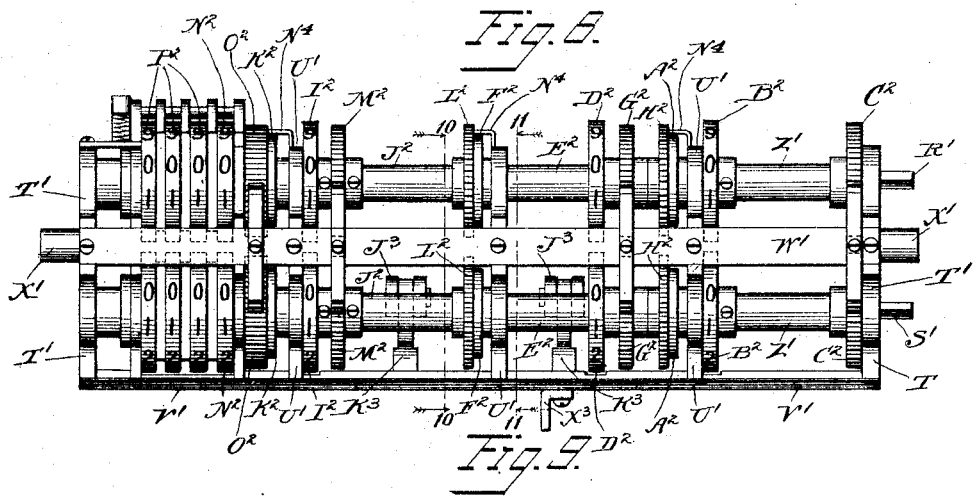
Figure 9:
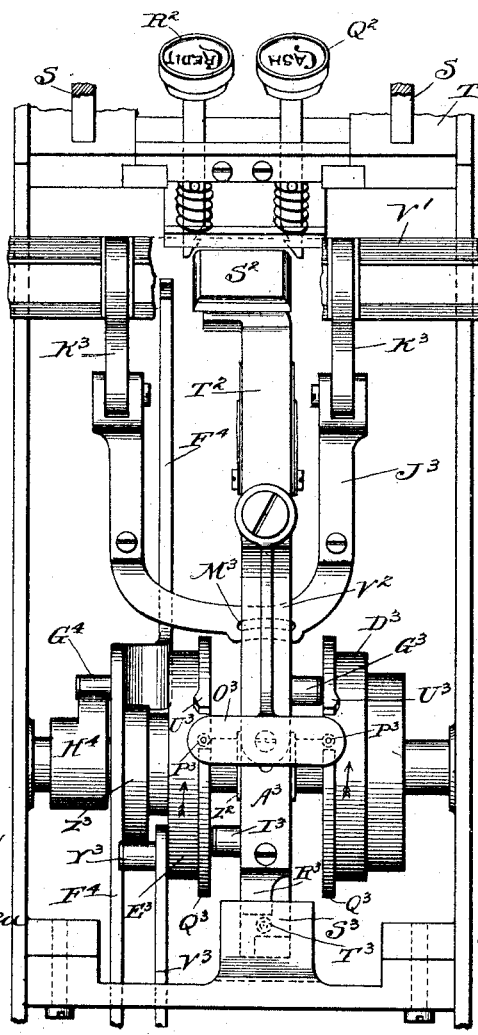

In the accompanying drawings, Figure 1 is a perspective view of the machine removed from its casing and looking at its right-hand forward corner; Fig. 2, a similar view looking at the left-hand forward corner of the machine, the right-hand corner thereof being broken away; Fig. 3, a vertical section in a plane slightly to the left of the right-hand row of keys in Fig. 1, looking toward the right of the machine; Fig. 4, a vertical section approximately at the left of the second row of keys in Fig. 1, looking toward the right of the machine; Fig. 4$^a$, a sectional detail view showing part of one row of keys, their slots and lugs, and the coöperating lugs upon the detent-plate, being a view of part of the keys shown in Fig. 4, looking toward the left instead of the right; Fig. 5, an elevation of the left-hand side or end of the machine, with portions of the casing and framework removed to expose the parts within; Fig. 6, a vertical section between the left-hand side frame of the machine and the printing attachment carried thereby; Fig. 7, a rear elevation of the right-hand portion of the machine; Fig. 8, a front elevation or plan view of the sets of registering-wheels and the rocking frame in which they are mounted; Fig. 9, an enlarged detail plan view of the cams and devices intermediate the same and the rocking registering-frame and the two shifter-keys as the parts appear when standing in rear of the machine and looking down upon them; Fig. 10, a middle section of the parts shown in Fig. 9 and the registers, looking toward the left in said figure; Fig. 10$^a$, a detail view of some of the parts shown in Fig. 10; Fig. 11, a view corresponding to Fig. 10, looking toward the right; and Fig. 12, a sectional detail of part of the key-locking device.

The same letters of reference are used to indicate identical parts in all the figures.

The main operating device of the machine consists of a handle A, Fig. 1, fast upon a stub-shaft journaled in the framework of the machine, said shaft or the hub of the handle having fast upon it a gear B, which meshes with a second gear C upon a second stub-shaft supported in the framework. The gear C meshes with a gear D, fast upon a rotary shaft E, and the gear D meshes with a gear F, fast upon a second rotary shaft G. The shafts E and G extend entirely across the machine and project beyond the left side of the frame, Fig. 6.

Journaled in the lower middle part of the machine and extending entirely across the same is a rock-shaft H, Figs. 1, 3, 4, and 6. Loosely mounted upon this shaft at about equal distances apart are four gear-toothed sectors or segments I. Meshing with each segment is a gear-wheel J, Fig. 3, by means of which wheels and suitable intermediate gears the four indicator-wheels K are geared to the respective segments.

Fast upon the rock-shaft H, near its right-hand end, Fig. 3, is a gear L, with which meshes a rack M, carried by or formed upon a sliding bar N, mounted by elongated slots O upon the shafts G and H. This bar has projecting from its right-hand side a stud P, (in this instance surrounded by an antifriction-sleeve,) which fits in a cam-groove Q, formed in a disk R, fast upon the shaft G. The result of this arrangement of the parts is that at each complete revolution of the operating-handle A the bar N is moved downward and forward and then back to normal position, thus causing the shaft H to be rocked forward and backward a definite distance at each operation. The segments I, being loose upon the shaft H, do not turn with it in either direction unless connected to it by the latch devices hereinafter described.

There is a set of numbered keys S for each segment, in this instance four, each set containing nine keys, representing the nine digits or multiples thereof in tens, the set of keys on the right representing units of cents, the second tens of cents, the third units of dollars, and the fourth tens of dollars. The keys are mounted radially to the shaft H in concentric guides T U, and are yieldingly held in and returned to their outer normal positions by means of coiled springs surrounding them and confined between the guide U and pins F', passed through the stems of the keys. The inner ends of the keys are beveled upon their upper sides, and each key is provided on one side with an inclined slot F$^2$, parallel with the bevel upon its end, Fig. 4$^a$, forming an inclined lug F$^3$ upon that side of the key between the slot and the end of the key to coöperate with the lugs upon the detent-plates V. There are four of these plates, one beneath each set of keys and concentric to the shaft H, upon which they are supported by radial arms. The plates V are provided upon their sides adjacent the keys with lugs F$^4$ of the shape shown in Figs 4 and 4$^a$. As there seen, the entire under side $a$ of each lug is beveled off, while the outer half of the upper side of the lug is cut away at $b$, leaving an upward projection $c$ adjacent the plate V. The result is that the passages between the lugs adjacent the surfaces of the plate V are of the shape seen at $d$ in Fig. 4$^a$, where the lugs are shown in section and the plate broken away. When any key is pressed in, its inclined lug F$^3$ will enter one of the passages $d$ and bear against the lug at its upper side and lift the plate V. Now when the lug F$^3$ has fully entered the passage it will be seen that if the plate V be positively held in the elevated position to which it has been lifted by the key the lug F$^3$ of the latter cannot slip out of the passage, and the key will be held in such inner position when pressure upon it is removed and its spring be prevented from throwing it upward to normal position until the plate V is released and permitted to drop back to normal position. As hereinafter described, there is provided means for holding the plate in the position to which it is lifted by pressing in any key until the operating-handle of the machine has substantially completed its movement, whereupon just at the end of the operation of the machine the plate is released and permitted to drop back to normal position and the spring of the operated key allowed to throw the key outward. There is a spring W connected to the lower supporting-arm of each plate V to aid gravity in yieldingly holding the plate in and returning it to normal position.

Fast upon the shaft H, one beside each segment I, are four plates X, having curved forward edges concentric to the shaft H, and each having secured upon its side at its upper end a lug Y and provided with a notch or cut-away space at the base of said lug beside the same. To a pendent extension Z of each segment I is pivoted a latch-arm A' of the shape shown in Figs. 3, 4, 5, and 6. This arm is provided in its rear edge with a notch B', adapted to coöperate with the lug Y upon the plate X. Fast upon the side of the arm A' is an arm C', whose upper end bears against the curved surface of the plate X. The engagement of this arm with the plate holds the latch-arm A' in the forward position shown against the stress of a spring C⁹, tending to pull it rearward, excepting when in the downward and forward movement of the plate X the notch in the upper end of the latter is brought opposite the upper end of the arm C', whereupon the spring C⁹ pulls the arm A' rearward and engages the notch B' with the lug Y. This will serve to couple the segment I to the plate X and shaft H, so that at the backward movement of said shaft the segment will be carried with it until the latch-arm A' is disengaged from the lug Y. This disengagement is effected by the inner end of the operated key, and is accordingly effected at different points, according to the particular key which has been pressed in. Each latch-arm A' is provided in its forwardly-extending front end with a notch or mouth D', Fig. 4, and also has secured to it a forwardly-projecting spring-arm E', adapted to coöperate with the pins F', passing through and projecting from the stems of the keys. The front end of the arm E' does not stand in a true vertical plane, but is inclined slightly away from the row of keys, and the ends of the pins F' are correspondingly beveled.

When the segment I has been coupled to the rock-shaft H in the manner before described, it will be carried backward by said shaft until the front end of the arm E' contacts with the pin F' of the operated key, whereupon the latch-arm will be arrested and rocked slightly forward upon its pivot, permitting the lug Y to escape from the notch B' and the segment to come to rest, while the rock-shaft and parts moving with it go on to normal position. The rocking of the latch-arm upon its pivot will cause the notch D' in its front end to catch over and embrace the inner end of the operated key, and as the arm C' is forced out of the notch in the plate X at the same time that the lug Y escapes from the notch B' and thereafter rides upon the full curved surface of the plate X the engagement of said plate and arm will maintain the latch-arm A' in forward position, with its outer end locked to the operated key.

For the purpose of locking the segment in such position after the operated key has been released and thrown outward to normal position and its inner end consequently disengaged from the notch in the end of the latch-arm there is secured upon the side of each of the guides U a curved plate G', whose innee edge is provided with a series of notches, onr for each key. Projecting from the side of each latch-arm A', near its front end, is a stud or pin H', Fig. 4, which, when the latch-arm is forced forward by the disengagement of the lug Y from its notch B' in the manner before explained, enters one of the notches in the plate G', and as the latch-arm is held in this outer position by the engagement of the plate X with the arm C' the segment will thus remain securely locked in the exact position at which it was arrested by the operated key after said key is released and thrown outward by its spring.

When the shaft H is rocked forward at the next operation of the machine, the lug Y will engage the notch B' in the latch-arm A' as soon as they come opposite each other, the engagement of the upper end of the arm C' with the notch in the plate X permitting the spring C⁹ to pull the latch-arm A' slightly rearward, thereby disengaging its pin H' from the notch in the plate G', so that the segment is released and left free to turn. At this moment the widened rear end of a downwardly and rearwardly extending arm I', carried by the plate X or shaft H, will contact with the rear edge of the radial supporting-arm of the rear end of the segment, so that in the further forward movement of the rock-shaft the segment will be carried with it and brought to its normal forward position.

In the upward movement of the segments the front ends of the spring-arms E' will contact with and be positively arrested by the pins F', as before explained; but in their downward movement the inclination of the front ends of the arms E' permits them to slip over the beveled ends of the pins F' and pass the same. If this were all of the mechanism, then at each operation of the machine the rock-shaft H would carry all the segments I forward to their limit of motion, but instead of leaving any of them there would carry all of them backward with it until they were disconnected from it by the operative keys, and if in any of the sets no keys happened to be depressed at that operation of the machine the rock-shaft would carry the segments corresponding to such sets backward with it to its limit of motion. For the purpose of preventing such operation there is provided means for preventing the engagement of any lug Y with the latch-arm of any segment corresponding to a set in which no key has been operated, or which if the lug and latch-arm have become engaged during the forward movement of the parts and the returning of the segment to forward position effects their disengagement when they reach such position and prevents reëngagement of them unless a key in the corresponding set is pressed in. The means for this purpose may be now described. Mounted at their rear ends upon the shaft H and at their front ends upon the framework of the machine are four sliding plates J', one beside each latch-arm and its coöperating devices. Each of these plates is provided at its rear end with an elongated slot, which embraces the shaft H, Figs. 3 and 4, and in its front end with a smaller similar slot, through which passes a screw entering the framework. A spring K', connected to the rear end of the plate, pulls it rearward, while it is normally held from such movement under the stress of the spring by the engagement of a lug L' upon the side of the detent-plate V near its lower end, with a notch in the upper side of the plate J' near the front end of the latter. Secured upon the side of the plate J' adjacent the plate X is a cam-plate M', Fig. 3, whose front edge is flush with or projects slightly beyond the front edge of the plate X. The upper end of the arm C', which is fast upon the latch-arm A', as heretofore described, has formed upon its side a lug B⁹, Fig. 4, which projects into the vertical plane of the plate M', the result being that whenever the segment is returned to its extreme forward position the lug B⁹ will ride over the cam-plate M' and the latch-arm be thrown forward to and maintained in the position shown in Fig. 3, the lug B⁹ catching under a shoulder upon the plate M' and locking the parts in such position. In such position the notch B' of the latch-arm will be entirely disengaged from the lug Y, so that so long as the cam-plate M' holds the latch-arm in this position the segment cannot become coupled to the rock-shaft, and if the latter is moved backward to initial position it will not affect the segment, which will remain in the position shown. If, however, the plate J' which carries the plate M' be moved rearward and the plate M' thereby carried away from the arm C', the latter will enter the notch in the plate X and the notch B' of the latch-arm engage the lug Y and the segment be thereby coupled to the rock-shaft. Now whenever any key in the set is pressed in the detent-plate V will be thereby lifted, as before explained, and the lug L' of the detent-plate be thereby lifted out of engagement with the notch in the plate J', whereupon the spring K' will pull the plate J' rearward, moving the cam-plate M' away from the arm C' and permitting the notch B' of the latch-arm to engage the lug Y of the plate X, and also bringing the upper edge of the plate J' (in front of the notch) under the lug L' of the plate V and thereby supporting the latter in lifted position and holding in the operated key in the manner heretofore described. It will thus be seen that unless a key in any given set is pressed in the segment corresponding to that set of keys will not be coupled to the rock-shaft, but will remain in its extreme forward position.

At the extreme backward limit of the movement of the rock-shaft all of the plates J' will be thrown forward and their notches brought under the lugs L' of the detent-plates again and the latter permitted to drop back to normal position and thereby release the operated keys. The means for thus resetting the plates J' consist of plates O', fast upon the lower ends of the plates X, Figs. 3 and 4, which plates O' at the extreme backward limit of the movement of the rock-shaft contact with rollers P', mounted in bearings Q' upon the under sides of the plates J' and project laterally therefrom into the path of the plates O'.

The position of the disk R upon the shaft G or the shape of the cam-groove Q in said disk is such that the parts do not come to rest at the end of an operation of the machine with the rock-shaft in its extreme rearward position. The shaft and parts carried by it reach such position shortly before the end of the operation and are advanced slightly therefrom before they come to rest. The plates J' are thus reset to normal position slightly before the end of the operation of the machine, and the plates O', which have reset them, then get out of their way before the operation ceases, so that the plates J' may be pulled rearward by their springs when the keys are pressed in preparatory to the next operation of the machine.

It will be understood that the numbers upon the indicator-wheels K are so arranged, and that the adjustment of the parts is such, as was the case in the machine upon which my invention is based, that when the segments are in their extreme forward position the ciphers upon the indicator-wheels will be exposed at the reading-opening in the casing and that when any segment is moved backward until arrested by an operated key the indicator-wheel geared to such segment will be turned to expose to view the number representing the value of such key.

The two sets of registering-wheels are actuated by the segments through the medium of the gears J, and may be next described.

The two shafts R' S', Figs. 8, 10ᵃ, and 11, upon which the respective sets of wheels are mounted, are journaled in a rocking frame, Fig. 8, composed of two end plates T', in which the shafts R' S' are mounted, a series of intermediate plates U', parallel with the end plates T', and cross bars or plates V' W', connecting the plates T' U'. Projecting from each end plate T' is a trunnion X', by means of which the rocking frame is journaled in bearings upon the side frames of the machine. The ends of the shafts R' S' each project beyond the right-hand plate T' and are squared to receive wrenches by which the shafts may be turned to reset the registering-wheels to zero, and the side frame of the machine is provided with suitable openings at Y', Fig. 1, for the insertion of the wrenches. Upon the right-hand end of each shaft is loosely mounted a sleeve Z'. These sleeves abut at their right-hand ends against the end plate T', while at their left-hand ends they extend through the first of the several intermediate plates U', heretofore referred to, and upon its extreme left-hand end, at the left of the plate U', each sleeve has fast upon it a single-toothed disk A², forming part of the transfer mechanism hereinafter described, while fast upon the sleeve immediately to the right of the plate U' is the units-of-cents-registering wheel B². Fast upon the right-hand end of the sleeve, adjacent the end plate T', is a pinion C², adapted to mesh with the right-hand one of the four gears J.

Each of the tens-of-cents-registering wheel $D^2$ is mounted upon a second sleeve $E^2$, which abuts at its right-hand end against the end of the sleeve $Z'$ and extends at its left-hand end through the middle one of the plates $U'$ and has fast upon it a single-toothed disk $F^2$, similar to the disk $A^2$ before mentioned. Fast upon the sleeve $E^2$, at the right of the wheel $D^2$, is a pinion $G^2$, adapted to mesh with the second one of the four gears J, while fast upon the extreme right-hand end of the sleeve and abutting against the single-toothed disk $A^2$ is a gear $H^2$, forming part of the transfer mechanism.

Each of the registering-wheels $I^2$, representing units of dollars, is fast upon the left-hand end of a sleeve $J^2$, whose left-hand end extends through the third plate $U'$ and has fast upon it a single-toothed disk $K^2$, corresponding to the disks $A^2 F^2$. Fast upon the extreme right-hand end of the sleeve against the disk $F^2$ is a gear $L^2$, corresponding to the gear $H^2$. The sleeve $J^2$ is turned by a pinion $M^2$, fast upon it near the wheel $I^2$ and adapted to mesh with the third one of the gears J.

Each of the registering-wheels $N^2$, representing tens of dollars, is fast upon the left-hand end of a short sleeve or hub (not shown) which has fast upon its right-hand end and abutting against the disk $A^2$ a wide pinion $O^2$. This pinion is driven by the fourth gear J; but being out of line with that said gear, to the right of it, it does not mesh directly with the gear, but with a second gear or toothed segment fast upon the hub or sleeve of the gear J a short distance to the right of the latter, as will be readily understood without illustration. Immediately at the left of the wheel $N^2$ are arranged several supplemental registering-wheels $P^2$, in this instance three in number, and representing, respectively, hundreds, thousands, and tens of thousands of dollars.

It will be understood from the foregoing and from Fig. 8 that the two sets of registering-wheels upon the shafts $R' S'$ are exactly alike. When the rocking frame which carries the shafts and registering-wheels is in normal position, as in the drawings, neither set of actuating-pinions will be in mesh with the gears J, as will be seen in Fig. 3, where the right-hand pinions $C^2$ are shown. Upon rocking the frame in either direction, however, one or the other set of pinions will be thrown into mesh with the gears J and the corresponding set of registering-wheels be actuated by the gears to add the amount of the registration upon one or the other of the sets of wheels, as desired. The means for rocking the frame to engage the respective sets of pinions with and disengage them from the gears J may be next described.

The two sets of registering-wheels may be used to register any two different classes of sales. Thus in a department store one set of wheels may be used to register the sales from one department, such as dry goods, and the other the sales from another department, such as groceries. On the other hand, they may be used to preserve separate registrations of cash and credit sales of all classes of goods, and in the present instance the machine is shown as designed for the latter purpose, to which end the two shifter-keys $Q^2 R^2$ are marked, respectively, "Cash" and "Credit." These keys are similar in shape and in their mode of operation to the regular keys S of the machine, as seen in Figs. 4 and 9, and are arranged side by side in suitable guides between the second and third rows of keys S. They are adapted to coöperate at their inner ends with a detent or latch-plate $S^2$, fast upon the front end of a lever $T^2$, pivoted to a bracket $U^2$ upon the framework of the machine, Figs. 4, 9, 10, and 11, and forked in rear of its pivot to form upwardly and downwardly bent arms $V^2 W^2$, whose rear ends are parallel with each other and extending rearwardly beyond the shaft G upon opposite sides of the same. The lever $T^2$, instead of being composed of a single integral piece having a forked rear end, in this instance is composed of two arms or plates, one integral with the arm $V^2$ and the other with the arm $W^2$; but as they are rigidly secured together the lever may be considered as a single member. Flat springs $X^2$, secured to the bracket $U^2$, project forward and bear against the opposite sides of a lug $Y^2$ upon the under side of the lever $T^2$ to yieldingly hold the lever in and return it to normal position. When the shifter-key $R^2$ is pressed inward, its beveled inner end will ride over the right-hand edge of the detent-plate $S^2$ and force said plate and the front end of the lever $T^2$ toward the left, and when the key has been pressed in far enough its notch will engage the edge of the plate and the latter will hold the key in its inner position, while the key will hold the plate and lever in their tilted position. On the other hand, when the key $Q^2$ is pressed in the lever $T^2$ will be forced to the right, and the engagement of the detent-plate with the notch in the key will hold the lever in that position and the key in its inner position.

Loosely mounted upon the shaft G, between the rear ends of the arms $V^2 W^2$, Figs. 10 and 11, is a square block $Z^2$, in which the shaft turns freely. Fitted over and adapted to slide upon this block is a frame $A^3$, having an elongated rectangular opening embracing the block and permitting backward and forward movement of the frame $A^3$ thereon. Screwed into the block $Z^2$, at opposite sides of the shaft G, are two pins $B^3$, which project through slots $C^3$ in the frame $A^3$ and fit at their outer ends in openings in the arms $V^2 W^2$. The result of this arrangement is that when the front end of the lever $T^2$ is moved in one direction by pressing in one of the shifter-keys the rear ends of the arms $V^2 W^2$ will shift the block $Z^2$ and frame $A^3$ in the opposite direction.

Fast upon the shaft G, at opposite sides of the frame A³, are two cam-disks D³ E³, Figs. 7 and 9, the disk D³ being provided upon its inner face with a cam-groove F³, Fig. 11, adapted to coöperate with a stud G³ upon the left-hand side of the frame A³, Fig. 9, and dotted line, Fig. 11, and the disk E³ being provided with a cam-groove H³, adapted to coöperate with a stud I³ upon the right side of the frame A³, Figs. 9 and 10. The shape and position of the respective cam-grooves are such that when the frame A³ is shifted to the left by pressing in the key Q² and the stud G³ thereby engaged with the cam-groove F³ in the disk D³ a revolution of said disk will operate to slide the frame A³ forward a slight distance and hold it in such forward position during a portion of the revolution of the cam and then return it to its normal position, while a revolution of the cam-disk E³ after the stud I³ upon the left side of the frame A³ has been engaged with its cam-groove H³ by pressing in the shifter-key R² will cause the frame A³ to be slid rearward from normal position and held in rearward position during a part of the revolution of the cam and then returned to its normal position.

From the foregoing description it will be understood that by connecting the frame A³ with the rocking frame in which the two sets of registering-wheels are mounted the rotation of the cams after one or another of the shifter-keys has been pressed in will cause said frame to be rocked in one direction or the other, according to which shifter-key is operated, to engage the pinions of the corresponding register with the gears J. The connection between the frame A³ and the rocking register-frame in this instance consists of a yoke J³, Fig. 9, connected at its rear ends to the frame A³, and having the front end of its respective arms pivoted to the upper rear ends of arms K³, projecting from the lower cross-bar V' of the register-frame, Figs. 8 to 11, the result being that when the frame A³ is slid forward, in consequence of an operation of the shifter-key Q², the pinions of the upper set of registering-wheels will be thrown into mesh with the gears J, while when the frame A³ is slid rearward in consequence of an operation of the shifter-key R² the pinions of the lower set of registering-wheels will be engaged with the gear J. The yoke J³ is connected with the front end of the frame A³ by a screw-stud L³, passing through a transverse slot M³ in the rear end of the yoke and entering a forwardly-projecting ledge N³ upon the front side of the frame A³, the yoke resting upon said ledge and the slot-and-pin connection of the parts permitting the frame A³ to be shifted laterally independently of the yoke, Fig. 9.

The upper arm V² of the shifting-lever T² has secured to or formed integral with its upper rear end a cross-head O³, which has mounted upon the under side of its opposite ends antifriction-rollers P³, adapted to coöperate with flanges Q³, formed upon the peripheries of the disks D³ E³. In the normal position of the parts the rollers P³ fit in notches in the flanges Q³, and in that position serve to lock the disks D³ E³ and shaft G, and consequently the entire driving mechanism of the machine, from movement. When either one of the shifter-keys is pressed in, the rollers P³ are carried out of the notches in the flanges and to the one side or the other of the planes of said flanges, so that the parts are free to turn, and the flanges then serve to lock the shifting-lever and maintain the parts in their shifted position until the cam-disks and flanges have been given a complete revolution and the notches in the flanges brought opposite the rollers P³ again.

As a further means of locking the parts in either one or the other of their shifted positions during the revolution of the cams, the frame A³ has projecting from its rear end a plate R³, in the upper side of which is formed a slot S³, Figs. 4, 7, and 9, said slot consisting of a middle transverse portion and two end portions extending in opposite directions at right angles to the middle portion. A stud T³ upon a fixed plate of the framework fits in this slot, and when the frame A³ is shifted to the left and slid rearward the engagement of the stud with the wall of the slot in front of its middle portion will lock the frame in shifted position during its backward-and-forward movement, and when the frame is shifted in the opposite direction and slid forward the engagement of the stud with the wall of the slot in rear of its middle portion will serve to lock the frame in such shifted position.

Each of the flanges Q³ of the cam-disks has formed upon it immediately in front of its notch an outwardly-projecting cam U³. As before stated, after the cross-head has been shifted to the right or to the left by pressing in one or the other of the shifter-keys the rollers P³ will bear against the corresponding faces of the flanges Q³ during the revolution of the cam-disks and thereby lock the parts in shifted position. Just at the end of the revolution of the disks one of the cams U³ will engage one of the rollers P³ and force the cross-head farther in the direction in which it has been shifted than it was moved by the operation of the shifter-key, and this extra movement given the cross-head will tilt the lever T² far enough to disengage the detent-plate S² upon its front end from the notch of the operated key and release the latter, which will thereupon be thrown outward to normal position by its spring. Thus if the parts have been shifted by pressing in the key Q² then at the end of the revolution of the parts the cam U³ upon the flange of the disk D³ will engage the left-hand roller P³ and throw the front end of the lever T² farther to the right to release said key, while if the parts have been shifted in the opposite direction by pressing in the key R² the cam U³ upon the flange of the disk E³ will effect the release of the key in the same manner.

From the foregoing it will be understood that upon pressing in the key Q² and giving the operating-handle a complete revolution the upper set of registering-wheels will be thrown into connection with the driving mechanism and the amount represented by the cash-keys which have been pressed in will be added upon the upper set of wheels, while upon pressing in the key R² before the handle is given its revolution the lower set of registering-wheels will be thrown into connection with the driving mechanism and the amount be added upon the lower set of wheels. The shapes of the cam-grooves which effect these engagements of the respective sets of wheels with the driving mechanism are such, as seen in Figs. 10 and 11, that the pinions of the registering-wheels are not engaged with the gears J until the rock-shaft H and parts carried by it have completed their forward movement and all of the segments I and gears J and indicators returned to initial position. Then the pinions are engaged with the gears J and held in engagement with them during the backward indicating and registering movements of the parts and are disengaged from them again before the driving mechanism reaches normal position and comes to rest. Thus at the beginning and the end of each operation both sets of registering-wheels are disengaged from the driving mechanism and during the operation one or the other of them is connected with it only during the registering and indicating movements of the parts. This arrangement enables me to dispense with any ratchet-and-pawl connection between the gears J and registering-wheels and to gear the latter positively to the gears J during their actuating movements. A ratchet-and-pawl connection may, however, be interposed between the gears J and registering-wheels without departing from this feature of my invention, in which event the cam-grooves in each disk might be so shaped as to slide the frame A³ in one direction or the other at the beginning of a revolution of the disks and maintain the frame in such moved position until the end of the revolution of the disks. In such case the registering-wheels would be turned with the gears J as the latter moved in one direction, but not in the other, or, if a ratchet-and-pawl connection between the gears J and pinions be employed, either the upper or lower set of wheels may be normally engaged with the gears J and a single shifting device be employed to throw the other set of wheels into engagement with it when desired, as will be readily understood.

For the purpose of locking the registering-frame in normal position there is provided a long forked lever V³, Figs. 4, 7, and 9, hung at its rear end upon a transverse rod W³, supported in the framework. The front end of the forwardly-extending arm of this lever coöperates with a notched locking-plate X³, Figs. 4 and 8, secured to the under side of the lower cross-bar v' of the registering-frame. The rear upwardly-extending arm of this lever carries an antifriction-roller Y³, Figs. 4, 7, and 9, which bears against a cam Z³, fast upon the shaft G. The shape of this cam is such that when the parts are in normal position it will hold the front end of the lower arm of the locking-lever in engagement with the notch in the plate X³ and thus lock the registering-frame in its normal position. When the shaft G is turned rearward in the operation of the machine, the cam will clear the roller just before the sliding frame A³ begins its forward or backward movement and the front end of the lever drops downwardly out of engagement with the notch in the plate X³ and permits the register-frame to be shifted in one direction or the other. After the registration has been effected and the registering-frame shifted back to normal position the cam rides under the roller upon the lever again and throws the front end of the lever forward into reëngagement with the notch in the plate X³ to lock the frame as before.

The transfer devices between the several registering-wheels of each set are of novel construction and may be next described, reference being had more particularly to Figs. 4, 8, 10, 10ᵃ, and 11. Mounted upon the left side of each of the division-plates U' of the rocking register-frame is a sliding plate A⁴, having pivoted to it two transfer-pawls B⁴, adapted to coöperate with the transfer-pinions of the registering-wheels, those shown in Fig 10, with the transfer-pinions L² of the third registering-wheels, Fig. 8, representing units of dollars. As the transfer devices for the several wheels are of the same construction a description of those coöperating with the pinions L² and shown in Fig. 10 will explain all of them. The reciprocating plate A⁴, which carries the pawls, is mounted upon the side of the fixed plate U' of the registering-frame by means of screws C⁴, passing through slots in the plate U', as seen in Fig. 11. These slots are of such shape that at the end of each upward movement of the plate A⁴ it will be thrown rearward to the left, in Fig. 10, for a purpose hereinafter explained. Each plate A⁴ has pivoted to it the upper end of a link E⁴, Fig. 4, whose lower end is pivoted to the front end of a long lever F⁴, having an upwardly-bent middle portion carrying an antifriction-roller G⁴, adapted to coöperate with a cam H⁴, fast upon the shaft G. A strong spring I⁴, connected to the lever F⁴ near its rear end, pulls the lever upward and maintains the roller G⁴ in engagement with the cam H⁴ and holds the pawl-carrying plate A⁴ in and returns it to its uppermost position when the cam H⁴ will permit.

As seen in Fig. 4, the cam H⁴ forces the lever downward just at the end of the operation of the machine and holds the parts in their lower position while the machine remains at rest. At the first forward movement of the parts at the beginning of an operation the cam is carried away from the pin $G^4$ and the lever released and lifted by its spring $I^4$, bringing the pawl-carrying plate $A^4$ and pawls to the position shown in Fig. 10. They remain in this upper position during nearly the entire operation of the machine, being moved downward again, as before explained, just at the end of the operation.

As shown in Fig. 8 and as heretofore described in connection with said figure, there is located immediately at the right of each transfer-pinion a single-toothed disk or cam which is fast upon the hub or sleeve of the preceding registering-wheel in the series. In Fig. 10 the single-toothed disks immediately behind the pinions $L^2$ are the disks $F^2$ shown in Fig. 8. Each pawl $B^4$ is held in normal position against a stop-pin by a spring $J^4$, and each has a forwardly-projecting heel $K^4$ at its lower end. Pressing against the upper end of each pawl is a spring-pressed sliding latch $L^4$, confined in a housing $M^4$ upon the plate $A^4$. When the pawls are in normal position, the pinions $L^2$ are out of their paths of travel and the plate $A^4$ may be reciprocated back and forth without the pawls engaging the pinions. If, however, with the pawl-carrying plate and pawls in their upper position, as in Fig. 10, the upper end of one of the pawls be tilted forward until it clears the latch $L^4$, the latter will spring downward behind the pawl and hold it in forward "set" position, as in Fig. $10^a$. When the parts are then moved downward at the end of the operation of the machine to the position seen in Fig. 4, the pawl will engage the pinion $L^2$ of the next higher registering-wheel and turn it the space of two teeth and thus advance the wheel to effect the transfer. Now when the parts are in the position shown in Fig. 10 the heels $K^4$ of the pawls stand in the path of travel of the single teeth upon the disks $F^2$, so that when any one of said disks is turned until its tooth moves from the position of the upper one in Fig. 10 to the position of the same one in Fig. $10^a$ the tooth will strike the heel $K^4$ of the pawl and tilt the pawl to the position shown in Fig. $10^a$, the latch $L^4$ catching behind the pawl and holding it in such position, as shown. At the downward movement of the parts the set-pawl will engage the notch between two of the teeth upon the pinion $L^2$ as the pawl-carrying plate moves forward through the approximately horizontal portion of its movement, and the pawl will then carry the pinion with it during the further downward movement of the parts, advancing the pinion two teeth and the registering-wheel one number, as before explained.

The upper latch $L^4$ extends entirely through the housing $M^4$ and has fastened upon its upper end a plate $N^4$, projecting to the right over the adjacent frame-plate $U'$, Figs. 8 and 11. As the parts reach their downward limit of movement the plate $N^4$ will contact with the upper edge of the plate $U'$ and return the latch $L^4$ to the position shown in Fig. 10, disengaging it from the pawl $B^4$ and permitting the spring $J^4$ to pull the pawl rearward to normal position against its stop. The lower latch is reset in substantially the same way, the plate $N^4$, secured to its upper end, contacting with a stop $O^4$ upon the side of the plate $U'$, for the same purpose and with the same result that the plate $N^4$ of the upper latch contacts with the upper edge of said plate $U'$. In this manner and by this means at each complete revolution of any registering-wheel in either set the transfer-pawl between it and the next higher wheel is caused to advance such higher wheel one-tenth of a revolution, or one number, to add upon it the amount represented by a complete revolution of the preceding wheel.

The several cams $H^4$, which operate the several levers $F^4$ to depress the pawl-carrying plates and pawls, are arranged in such graduated order upon the shaft $G$ as to depress the levers $F^4$ successively from the right to the left, as is common in transfer mechanisms in this class of machines, so that the proper transfer may be always effected, as will be readily understood.

For the purpose of locking all of the unoperated keys as soon as the operating-handle has been moved from normal position and to thereby prevent operation of any of them until the handle has been given a complete revolution and brought to normal position again the following locking means is employed: Secured upon a rock-shaft $P^4$, extending across the lower forward part of the machine, are four hooks $Q^4$, adapted to coöperate with notches $R^4$ in the respective detent-plates V. When the shaft is in its normal position shown, the hooks are disengaged from the notches and the detent-plates are free to be lifted by pressing in the keys, but when the shaft is rocked forward the hooks are engaged with the respective plates and lock them from upward movement, so that until the shaft is turned rearward again to normal position no keys can be pressed in. Fast upon the right-hand end of the shaft, Fig. 1, is a vertically-extending arm $S^4$, whose upper end is bent rearwardly and bears against the hub of the gear B, heretofore described, a spring $T^4$, connected to the arm, pulling it rearward and yieldingly holding it in such engagement. This hub has in it a notch in which fits the rear end of said arm when the operating-handle is in normal position, Fig. 12, but as soon as the handle is turned from such position the end of the frame is forced out of the notch and thereby thrown slightly forward, rocking the shaft $P^4$ forward and engaging the hooks $Q^4$ with the notches in the detent-plates, with the result before explained. When the operating-handle and the parts turning with it reach normal position again, the spring $T^4$ pulls the arm $S^4$ rearward and engages its upper end with the notch in the hub, and thereby unlocks the detent-plates.

The gears J, which, as heretofore stated, are loosely mounted upon the shaft E, are secured, respectively, upon the right-hand ends of concentric sleeves $U^4$, free to turn independently upon said shaft. The shaft and sleeves extend through and project beyond the left-hand side frame of the machine and have fast upon their respective outer ends four segmental type-carriers $V^4$. These type-carriers are arranged within a supplemental frame $W^4$, in whose outer plate the extreme end of the shaft E is journaled. Mounted in a forwardly-inclined guideway upon the inner or right-hand plate of the supplemental frame $W^4$ is a sliding bar $X^4$, Fig. 7, and dotted line, Fig. 5, which has secured at its lower end a flat plate or platen-support $Y^4$, projecting at right angles from its right side, Fig. 5. Pivoted to the left side of the sliding bar $X^4$ near its upper end, Fig. 5, is the upper arm of a bell-crank $Z^4$, Fig. 6, hung upon a shaft $A^5$. The lower arm of this bell-crank has near its front end a laterally-projecting stud $B^5$, which fits in a cam-groove $C^5$ in a disk $D^5$, fast upon the shaft G at the right of the frame $W^4$, Fig. 7. The revolution of the shaft G and disk $D^5$ will thus reciprocate the bar $X^4$ in its guideway and lower and raise the platen-supporting plate $Y^4$, carried by its lower end. At its highest movement said platen-support will carry the platen $Y^5$ against the types upon the carriers $V^4$ and effect the printing of their numbers upon a paper strip or strips passed between them and the platen.

The types are inked by a pad $E^5$, carried by a swinging arm $F^5$, Figs. 2 and 5, hung at its upper end to an arm $G^5$, secured at its lower rear end to the left-hand end of a sleeve $H^5$, surrounding the sleeves $U^4$ upon the shaft E, Fig. 7, and extending to the right through the right-hand plate of the frame $W^4$ and bar $X^4$ and having fast upon its right-hand end a hub $I^5$, Fig. 6, having a rearwardly-projecting arm, to which is pivoted the upper end of an arm $J^5$, slotted at its lower end and embracing the shaft G and provided upon its right side with a stud fitting in a cam-groove in a disk $K^5$, fast upon the shaft G, Fig. 7. The disk $K^5$ is immediately behind the disk $D^5$ in Fig. 6; but without further illustration it will be sufficient to say that the shape of the cam-groove in the disk $K^5$ is such that at each operation of the machine and revolution of the disk the pad $E^5$ is lowered far enough to ink the lowermost types upon the segments and then lifted to the normal position shown.

The four type-carriers $V^4$ respectively bear type-numbers corresponding to the respective gears J and indicator-wheels with which they move, and whenever any indicator is turned until a given one of its numbers is exposed at the reading opening or window of the casing the corresponding number upon the type-carrier is brought to the printing-point above the platen $Y^5$ upon the support $Y^4$. Besides the four type-carriers corresponding to the four indicators there is a fifth carrier $L^5$ at the right of the others, Figs. 5 and 7, bearing the signs "Cs." and "Cr.," the former representing the word "Cash" and corresponding to the cash-shifter key and cash-register and the other representing the word "Credit" and corresponding to the credit-shifter key and credit-register. The rocking frame which carries the registering-wheels has projecting laterally from its left hand a pin $M^5$, Figs. 2, 5, 6, and 7, whose extreme outer end is connected by a pivoted link $N^5$ with the arm of the type-carrier $L^5$, so that the rocking of the frame in one direction or the other will rock the type-carrier and bring its proper sign to the printing-point. The pin $M^5$ of the rocking register-frame is also embraced by the lower slotted end of a lever $O^5$, Fig. 6, whose notched upper end engages a pin upon the hub of a rocking indicator $P^5$, bearing the two signs "Cs." and "Cr.," Fig. 2, representing the words "Cash" and "Credit," as do the corresponding signs upon the type-carrier. At each operation of the machine the movement of the register-frame will shift the indicator to bring the proper sign to the reading-opening to indicate the character of the sale. The indicator $P^5$ is yieldingly held in each of its shifted positions by a spring-detent $Q^5$, which engages notches in its hub, and the slot in its upper end is wide enough to permit the indicator to remain in either shifted position after the lever has returned to its normal position, so that the indication of the character of the sale remains exposed at the end of the operation of the machine.

The shape of the cam-groove in the disk $D^5$, Fig. 6, is such that when the parts are in their normal position of rest the bar $X^4$ is held in almost its highest position, with the platen $Y^5$ nearly in contact with the types upon the carriers $V^4$. At the first forward movement of the disk $D^5$, at the very beginning of the operation, the platen is lifted into contact with the types and then is lowered some distance away from them, and then just at the end of the operation the platen is lifted against the types again and slightly lowered away from them as the parts come to rest. In this manner, at the very beginning of each operation, the platen is carried against the types while the latter remain in the position at which they were set at the last preceding operation of the machine, and thus the amount and character of the immediately-preceding sale will be printed upon a paper strip passed between the platen and types. Between this impressing movement of the platen, however, and the one which occurs just at the end of the operation of the machine, as before described, the type-carriers will have been set to print the amount and character of the new sale, so that when the platen is given its second impressing movement it will effect the printing of the amount and character of the new sale. The printing of the amount of the preceding sale, at the first of the aforesaid impressing movements of the platen, is effected upon the paper record-strip R⁵, Fig. 5, which is carried upon a supply-reel S⁵, whence it is led upward and forward over the platen-support Y⁴, and thence downward and wound upon a storage-reel T⁵. The reels S⁵ and T⁵ are both carried by and move with the bar X⁴ and platen-support Y⁴. The reel T⁵ has fast upon it a toothed disk U⁵, with which coöperates an actuating-pawl V⁵, operated by the reciprocating movements of the bar X⁴ and platen-support Y⁴ in the manner described in one of the prior patents heretofore referred to, and which need not be explained here further than to say that at each operation of the machine the storage-reel T⁵ is automatically turned a sufficient distance to carry the printed number upon the record-strip away from the printing-point and bring a blank space of the strip thereto ready for the printing of the next amount.

The printing mechanism above described, with the exception of the device for printing the character of each sale in addition to the amount of it, is similar to that shown and described in Patent No. 483,511, heretofore referred to, and the distinguishing feature of this part of my invention relates to the printing of the amount, or the amount and character, of each sale upon a separate sales-slip, or upon duplicate slips, passed between the platen and type-carriers, in addition to the printing upon the record-strip above referred to, and this feature of my invention may be now described. Journaled in the rear portion of the frame W⁴ is a type-cylinder W⁵, Figs. 5 and 7, geared to and actuated by the rotary shaft E and containing a set of dating-wheels and a set of automatically-actuated consecutive-numbering wheels, similar to that shown and described in the patent above referred to. Journaled beneath this type-cylinder and geared to it is a pressure-roller X⁵, the cylinder W⁵ and roller X⁵ constituting a pair of combined printing and feeding rollers for advancing a paper slip placed between them and printing a number and date thereon. Journaled in rear of the type-cylinder W⁵ and geared to it is an inking-roller Y⁵, which bears against the types to ink them. There is an inclined slot or opening in the outer side plate of the casing W⁴ in line with the passage between the type-cylinder and roller X⁵, and there is secured to the frame coincident with said slot or opening a large shelf Z⁵, Figs. 2, 5, and 7, adapted to support a loose paper slip when laid thereon and slipped sidewise between the type-cylinder and roller.

The shelf Z⁵ is provided along its rear edge and at its inner rear corner with a guard-flange A⁶, to hold the slip in position when placed upon the shelf. The end flanges of the type-cylinder W⁵, which coöperate with the roller X⁵ to advance the slip, are cut away for a considerable space, so that during the time the cut-away spaces are passing opposite the roller X⁵ the slip will not be pressed between the cylinder and roller and advanced, but will remain stationary. The adjustment of the parts is such that the rear ends of these cut-away spaces are opposite the roller X⁵ when the machine is at rest and the parts at normal position, so that the edge of the slip can be readily inserted between the type-cylinder and roller, as seen in Fig. 5.

Under this construction, if a sales-slip of the usual size, which will be approximately that of the shelf Z⁵, is placed upon such shelf and slid laterally to the right until its right-hand edge is flush with the right-hand edge of the shelf and the operating-handle is given a revolution, the slip will be caught between the type-cylinder and roller X⁵ at the first forward movement of the parts and will be advaced from the shelf to the printing-point above the platen-support Y⁴ and rest upon the latter. In advancing the slip to this position the types of the type-cylinder will have printed a date and consecutive number upon it, and when it has been advanced to proper position the cut-away spaces in the end flanges of the cylinder will come opposite the roller X⁵ and the slip will be released from such feed-rollers and come to rest above the platen-support Y⁴ shortly before the end of the operation of the machine. As the platen is lifted against the types at the end of the operation the amount of the sale will be printed upon such slip, and as the platen is slightly retracted from the types as the parts come to rest the slip is then free to be removed by hand.

For the purpose of holding the slip in position upon the platen-support Y⁴, after it has been released from the feed-rollers which have advanced it to such position and to prevent it from becoming accidentally displaced before the amount of the sale is printed upon it, there is provided a curved arm B⁶, Fig. 5, hung at its rear end upon the spindle of the type-cylinder W⁵, and provided near its upper end with a laterally-projecting stud C⁶, which rests upon the periphery of a disk D⁶, fast upon the rotary shaft E. A spring interposed between the upper end of the arm B⁶ and the top plate of the frame W⁴ presses the arm downward and holds the stud C⁶ against the disk D⁶. The disk D⁶ has a portion of its periphery cut away, and when in the revolution of the disk this cut-away space comes opposite the stud C⁶ the spring forces the arm downward. The arm carries at its lower end one or more spring arms or clips E⁶, adapted to bear at their front ends upon the paper slip over the platen-support Y⁴ when the arm is released by the disk D⁶ and pressed downward by the spring. The position of the cut-away space of the disk D⁶ is such that it will come opposite the stud $C^6$ and release the arm $B^6$ at substantially the same time that the cut-away spaces of the end flanges of the type-cylinder come opposite the roller $X^5$ and release the slip from the grasp of the feed-rollers. The slip is thus caught by the spring-arms $E^6$ and held in position until after the amount of the sale has been printed upon it, whereupon, just at the end of the operation of the machine, the cut-away space of the disk $D^6$ will be carried past the stud $C^6$ and the arm $B^6$ be lifted again to normal position and the slip released so that it may be removed by hand. In this manner and by these means the amount of each sale may be printed upon the loose sales-slip placed upon the shelf $Z^5$ without interfering with the printing of the amounts of the sales upon the record-strip $R^5$, and it will be understood that two or more duplicate sales-slips with carbon-sheets between them may likewise be inserted at once between the feed-rollers and advanced to the printing-point and all be numbered and dated and have the amount of the sale printed upon them. It is generally desirable to print the date upon the slips and consecutively number them, but when this can be dispensed with the type-cylinder and inking-roller may also be dispensed with and a simple feed-roller, to coöperate with the roller $X^5$, be substituted for them. So far as the work of advancing the slips to the printing-point is concerned the type-cylinder $W^5$ of course operates simply as a feed-roller.

From the foregoing description of my invention it will be understood that in its broader scope it does not relate to details of construction and arrangement of parts, but consists in the broad combinations and modes of operation described, and is not intended to be restricted beyond the terms of my respective claims and the requirements of the prior art.

In a division of this application, filed January 30, 1897, and bearing Serial No. 621,299, I have described and claimed certain features of the present invention which are also illustrated and described in the present application, and I hereby reserve to said divisional application the subject-matter claimed therein.

Having thus fully described my invention, I claim—

1. In a registering-machine, the combination of a reciprocating driving member having a uniform and positive movement, a series of reciprocating driven members having variable movements, means for positively connecting said driven members with the driving member to cause the latter to impart positive movements to them in both directions, a series of sets of keys controlling the positive connection of the respective driven members with the driving member and determining the degrees of movement imparted to them by the driving member, two registers mounted in a single movable frame normally holding both registers out of engagement with the driven members, and two shifter-keys and connections for moving the frame to connect either register at will with the driven members, substantially as described.

2. In a registering-machine, the combination of a driving mechanism, two registers normally disconnected therefrom, means actuated by the driving mechanism for independently connecting the registers with such mechanism, and means for determining the movement imparted by the driving mechanism to the connected register, substantially as described.

3. In a registering-machine, the combination of a driving mechanism, two registers normally disconnected therefrom, two shifter-keys, means actuated by the driving mechanism and controlled by said keys for connecting either register at will with the driving mechanism, and means for determining the movement imparted by the driving mechanism to the connected register, substantially as described.

4. In a register, the combination of a driving mechanism, two registers mounted in a movable frame normally holding both registers out of connection with the driving mechanism, means actuated by the driving mechanism for independently connecting the respective registers to such mechanism, and means for determining the extent of movement imparted by the driving mechanism to the connected register, substantially as described.

5. In a register, the combination of a driving mechanism, two registers mounted in a movable frame normally holding both registers out of connection with the driving mechanism, two shifter-keys, means actuated by the driving mechanism and controlled by said keys for moving the registering-frame to connect either register at will with the driving mechanism, and means for determining the extent of movement imparted by the driving mechanism to the connected register, substantially as described.

6. In a registering-machine, the combination of a driving mechanism, two registers mounted in a movable frame normally holding both registers out of connection with the driving mechanism, two cams and connections for moving the frame in opposite directions, to connect either register at will with the driving mechanism, two keys controlling the connection of said cams with the movable frame, and means for determining the extent of movement imparted by the driving mechanism to the connected register, substantially as described.

7. In a registering-machine, the combination of a driving mechanism, two registers mounted in a movable frame normally holding both registers out of connection with the driving mechanism, two cams actuated by the driving mechanism, a reciprocating frame connected to the register-frame and adapted to be moved in opposite directions by the respective cams to connect either register with the driving mechanism at will, two shifter-keys for connecting the reciprocating frame with the respective cams, and means for determining the movement imparted by the driving mechanism to the connected register, substantially as described.

8. In a registering-machine, the combination, with a driving mechanism, an oscillatory segment moved positively in both directions by said mechanism, means for connecting the segment with and disconnecting it from the driving mechanism, and a series of keys for determining the extent of movement imparted to the segment, of a register and means independent of said keys for throwing it into and out of gear with the segment at each operation of the machine, to cause it to be actuated by the segment during the movement of the latter in one direction, substantially as described.

9. In a registering-machine, the combination, with a driving mechanism, a series of oscillatory segments moved positively in both directions by said mechanism, means for connecting the segments with and disconnecting them from the driving mechanism, and a series of keys for determining the extent of movement imparted to the segments, of a register and means independent of said keys and operated by the driving mechanism for throwing the register into and out of gear with the segments at each operation, to cause the register to be actuated by the segments during their movement in one direction, substantially as described.

10. In a registering-machine, the combination, with a driving mechanism, a series of oscillatory segments moved positively in both directions by said mechanism, means for connecting the segments with and disconnecting them from the driving mechanism, and a series of keys for determining the extent of movement imparted to the segments, of a register, and a cam and connections operated by the driving mechanism independently of said keys for throwing the register into and out of gear with the segments at each operation, to cause the register to be actuated by the segments during their movement in one direction, substantially as described.

11. In a registering-machine, the combination, with a driving mechanism, a series of oscillatory segments moved positively in both directions by said mechanism, means for connecting the segments with and disconnecting them from the driving mechanism, and means for determining the extent of movement imparted to the segments, of two registers adapted to be independently thrown into gear with the segments, and means actuated by the driving mechanism for independently connecting the registers with the segments to cause the registering movement of the segments to be imparted to either register at will, substantially as described.

12. In a registering-machine, the combination of a series of reciprocating segments, a series of sets of keys representing different denominations, one set coöperating with each segment to determine its different degrees of movement at the operation of different keys, a plurality of registers for registering different classes of transactions, arranged to be independently actuated by the movements of said segments, a plurality of cash-indicators coöperating with the several segments to indicate the amounts registered, a plurality of special keys corresponding to the several registers for determining which register shall be actuated by the segments at each operation of the machine, and special indicating devices coöperating with said special keys to indicate the different classes of transactions registered.

13. In a registering-machine, the combination of a series of reciprocating segments hung upon a central shaft, a series of sets of keys arranged radially to said shaft and representing different denominations, each set consisting of a single row of nine keys representing the nine digits (or multiples thereof by ten), and one of said sets coöperating with each segment to determine the different degrees of movement of said segment at the operations of different keys in its set, a plurality of rotary indicator-wheels coöperating with the segments to indicate the amounts registered, a plurality of registers, for registering different classes of transactions, arranged to be independently actuated by the movements of the segments, and a plurality of special keys corresponding to the several registers, the operation of one or another of which determines which register shall be actuated by the segments at each operation of the machine.

14. In a registering-machine, the combination, with the rock-shaft of the driving mechanism, the segments loose thereon, means for connecting the segments with and disconnecting them from the rock-shaft, and a series of sets of keys for determining the extent of movement imparted to the segments, of a register, and means independent of said keys for throwing it into and out of gear with the segments at each operation of the machine to cause it to be actuated by the segments during their movement in one direction.

15. In a registering-machine, the combination, with the rock-shaft of the driving mechanism, the segments loose thereon, means for connecting the segments with and disconnecting them from the rock-shaft, and a series of sets of keys for determining the extent of movement imparted to the segments, of a register, and a cam and connections operated by the driving mechanism independently of said keys for throwing the register into and out of gear with the segments at each operation of the machine, to cause the register to be actuated by the segments during their movement in one direction.

16. In a registering-machine, the combination, with the rock-shaft of the driving mechanism, the segments loose thereon, means for connecting the segments with and disconnecting them from the rock-shaft, and a series of sets of keys for determining the extent of movement imparted to the segments, of two registers, and means operated by the driving mechanism independently of said keys for throwing the respective registers into gear with the segments, to cause the registering movement of the segments to be imparted to either register at will.

17. In a registering-machine, the combination, with the rock-shaft of the driving mechanism, the segments loose thereon, means for connecting the segments with and disconnecting them from the rock-shaft, and a series of sets of keys for determining the extent of movement imparted to the segments, of a plurality of registers, means for separately connecting the several registers with the driving mechanism to cause the latter to throw them into gear with the segments, and a plurality of special keys coöperating with such connecting means to determine the connection of the different registers with the driving mechanism, substantially as described.

18. In a registering-machine, the combination, with the rock-shaft of the driving mechanism, the segments loose thereon, means for connecting the segments with and disconnecting them from the rock-shaft, and means for determining the extent of movement imparted to the segments, of two registers mounted in a movable frame adapted to be shifted to throw either register into gear with the segments, and means actuated by the driving mechanism for shifting said frame for said purpose, substantially as described.

19. In a registering-machine, the combination, with the rock-shaft of the driving mechanism, the segments loose thereon, means for connecting the segments with and disconnecting them from the rock-shaft, and means for determining the extent of movement imparted to the segments, of two registers mounted in a movable frame adapted to be shifted to throw either register into gear with the segments, two cams operated by the driving mechanism, and means for connecting either cam at will with said frame to throw the corresponding register into gear with the segments, substantially as described.

20. In a machine such as described, the combination, with the operating-keys S and the detent-plates $V^2$ coöperating therewith, of the rock-shaft $P^4$, the hooks $Q^4$ fast thereon and adapted to coöperate with the plates V, and a connection with the driving mechanism for rocking the shaft $P^4$ at the beginning of the movement of said mechanism to throw the hooks $Q^4$ into engagement with the plates V, for the purpose described.

21. The combination of the rock-shaft H, the plates X fast thereon and carrying the lugs Y, the segments I loose upon the shaft, the latch-arms A' carried by the segments and provided with the notches B' coöperating with the lugs Y, the arms C' fast upon the latch-arm A' and coöperating with the edges of the plates X and notches therein, the keys S, the detent-plates V coöperating therewith, and the notched locking-plates G' coöperating with the projections H' upon the latch-arms A' to lock the segments in the position at which they are arrested by the keys when said keys are released, substantially as described.

22. The combination of the rock-shaft H, the plates X fast thereon and carrying the lugs Y, the segments I loose upon the shaft, the latch-arms A' carried by the segments, the arms C' fast upon the latch-arms, the forwardly-projecting spring-arms E' carried by the latch-arms A', the keys S having the pins F' coöperating with the springs E', and the detent-plates V coöperating with the keys, substantially as described.

23. The combination of the rock-shaft H, the plates X fast thereon and having the lugs Y, the segments I loose upon the shaft, the latch-arms A' carried by the segments, the arms C' fast upon the arms A' and having the laterally-projecting lugs $B^9$, the operating-keys S and coöperating detent-plates V, the sliding latch-bars J' having the notches coöperating with the detent-plates, the plates M' fast upon the bars J' and coöperating with the lugs $B^9$ upon the arms C', and the plates O' carried by the plates X and coöperating with the rollers P' carried by the latch-bars J', substantially as described.

24. The combination of the keys S having beveled inner ends and provided with the inclined lugs $F^3$, the detent-plates V provided with the lugs $F^4$ having the beveled under sides $a$, with the outer ends of their upper sides cut away at $b$ leaving upward projections $c$ adjacent the plate V, the spring-pressed sliding latch-bars J' having the notches coöperating with the plates V and operating when the plates V are lifted and the bars J' pulled rearward by their springs to hold the plates V in elevated position and lock the operated keys in their inner position, and means for resetting the bars J' at the end of the operation, substantially as described.

25. In a registering-machine, the combination, with the driving mechanism and the oscillatory segments actuated thereby, of a plurality of registers for registering different classes of sales mounted in a movable frame and adapted to be severally and independently connected with the segments, of an oscillatory indicator bearing indicating-signs representing the different classes of sales, and a connection between said movable frame and indicator for causing the frame to move the indicator to different positions corresponding to the particular register thrown into gear with the segments, substantially as and for the purpose described.

26. In a registering-machine, the combination, with the rock-shaft of the driving mechanism, the segments loose thereon, and means for connecting the segments with and disconnecting them from the rock-shaft to cause the latter to impart different degrees of movement to them, of a plurality of registers for registering different classes of sales mounted in a movable frame and adapted to be severally and independently thrown into gear with the segments, an oscillatory indicator bearing indicating-signs representing the different classes of sales, and a rocking lever intermediate the movable frame and indicator for causing the movement of the frame which throws a given register into gear with the segments to move the indicator to position to expose to view the sign representing the corresponding class of sale, substantially as described.

27. In a registering-machine, the combination, with the rock-shaft of the driving mechanism, the segments loose thereon, means for connecting the segments with and disconnecting them from the rock-shaft to cause the latter to impart different degrees of movement to them, of a plurality of registers for registering different classes of sales mounted in a movable frame and adapted to be severally and independently thrown into and out of gear with the segments, a plurality of special keys corresponding to the several registers and coöperating therewith to connect the movable frame with the driving mechanism so as to cause the latter to throw the register corresponding to the operated key into gear with the segments, and an indicator representing the different classes of sales and actuated at each operation to expose to view the indicating-sign corresponding to the register thrown into gear with the segments, substantially as described.

28. In the machine described, the combination of the rocking register-frame carrying the two registers, the rocking indicator $P^5$, and the intermediate lever $O^5$, substantially as described.

29. In the machine described, the combination of the rocking register-frame carrying the two registers, the rocking indicator $P^5$, the intermediate lever $O^5$, and the spring-detent $Q^5$ for holding the indicator in its opposite shifted positions, substantially as described.

30. In a transfer mechanism for registering-machines, the combination of the gear $L^2$, the toothed disk $F^2$, reciprocationg pawl-carrying plate $A^4$, the pawl $B^4$ carried thereby and having a heel $K^4$ adapted to coöperate with the tooth of the disk $F^2$, the spring-latch $L^4$ coöperating with the pawl $B^4$, and a stop coöperating with the latch, substantially as described.

31. In a transfer mechanism for registering-machines, the combination of the gear $L^2$, the toothed disk $F^2$, the plate $U'$ having the cam-slot $D^4$, the reciprocating pawl-carrying plate $A^4$ mounted upon the plate $U'$ by a screw passing through the slot $D^4$, the pawl $B^4$ carried by the plate $A^4$ and having the heel $K^4$ adapted to coöperate with the toothed disk $F^2$, the spring-latch $L^4$ coöperating with the pawl $B^4$, and a stop upon the plate $U'$ coöperating with the latch, substantially as described.

32. In a machine such as described, the combination, with the type-carrier and platen, of a pair of feed-rollers having when at rest a free passage between them from their outer ends, to permit a loose sales-slip to be inserted laterally between them, and operating when turned to grasp the slip and advance it to the printing-point, and a single driving mechanism for actuating the type-carrier, platen, and feed-rollers, to set the carrier, advance the slip, and effect the printing.

33. In a machine such as described, the combination, with the type-carrier and platen, of a pair of feed-rollers, a portion of the periphery of one or both of which is cut away to form a free passage between the rollers from their outer ends when the cut-away space is intermediate the two rollers, to permit a loose sales-slip to be inserted laterally between the rollers from their outer ends, and operating when turned until the cut-away space is carried from between the rollers to grasp the slip and advance it to the printing-point, and a single driving mechanism for actuating the type-carrier, platen, and feed-rollers, substantially as described.

34. In a machine such as described, the combination, with the type-carrier and platen, of a pair of feed-rollers having when at rest a free passage between them from their outer ends, to permit a loose sales-slip to be inserted laterally between them, and operating when turned to advance the said slip to the printing-point, an automatic device engaging the slip and holding it in position after it has been released by the rollers and while the printing is being effected, and means for actuating the type-carrier, platen, feed-rollers, and slip-holding device.

35. In a machine such as described, the combination, with the type-carrier and platen, of a pair of feed-rollers having when at rest a free passage between them from their outer ends, a sales-slip support adjacent said rollers and projecting laterally beyond their outer ends, and adapted to have a loose sales-slip laid upon it and slid laterally between the rollers, the rollers operating when then turned to grasp the slip and advance it to the printing-point, and means for actuating the type-carriers, platen and feed-rollers.

36. In a machine such as described, the combination, with the rock-shaft of the driving mechanism, the segments loose thereon, and means for connecting the segments with and disconnecting them from the rock-shaft, of the type-carriers geared to the segments, the platen coöperating with the carriers, and a pair of feed-rollers actuated by the driving mechanism and having when at rest a free passage between them from their outer ends, to permit a loose sales-slip to be inserted laterally between them, and coöperating when turned to advance said slip to the printing-point, substantially as described.

37. In a machine such as described, the combination, with the rock-shaft of the driving mechanism, the segments loose thereon, and means for connecting the segments with and disconnecting them from the rock-shaft, of the type-carriers geared to the segments, the platen coöperating with the carriers, a pair of feed-rollers having when at rest a free passage between them from their outer ends, and a sales-slip support adjacent said rollers and projecting laterally beyond their outer ends, and adapted to have a loose sales-slip laid upon it, and slid laterally between the rollers, the latter then operating when turned to advance said slip to the printing-point, substantially as described.

38. In a machine such as described, the combination, with the type-carriers and platen, of a pair of feed-rollers, consisting of a type-cylinder and an impression-roller, having when at rest a free passage between them from their outer ends, to permit a loose sales-slip to be inserted laterally between them and operating when turned to print said slip and advance it to the printing-point between the type-carriers and platen, and means for actuating the type-carriers, platen and rollers, substantially as described.

39. In a machine such as described, the combination, with the type-carrier and platen, of the feed-rollers $W^5 X^5$, one having a portion of its periphery cut away to form a free passage between the rollers from their outer ends when they are in normal position, the sales-slip support $Z^5$ secured to the framework in a plane parallel with and adjacent the passage between the rollers and projecting laterally beyond their outer ends, and adapted to have a loose slip laid upon it and slid laterally between the rollers, and means for actuating the type-carriers, platen and rollers, substantially as described.

40. In a machine such as described, the combination, with the type-carriers and platen, of the feed-rollers $W^5 X^5$, one having a portion of its periphery cut away to form a free passage between the rollers from their outer ends, the sales-slip support consisting of the inclined shelf $Z^5$ secured at one edge to the framework and projecting at its other beyond the outer ends of the rollers, having an opening in it through which projects the roller $X^5$, and provided at its rear edge with the guard $A^6$, substantially as and for the purpose described.

41. In a machine such as described, the combination, with the type-carriers $V^4$ and the platen coöperating therewith, of the sales-slip-support shelf $Z^5$, and the type-cylinder $W^5$ and roller $X^5$ for advancing the slips from the support to the printing-point, said type-cylinder and roller having a free passage between them from their outer ends, to permit the slips placed upon the shelf $Z^5$ to be slid laterally between them, substantially as described.

42. In a machine such as described, the combination, with the type-carriers $V^4$ and the platen coöperating therewith, of the sales-slip-supporting shelf $Z^5$, the type-cylinder $W^5$ and roller $X^5$, the arm $B^6$ and the rotary disk $D^6$ coöperating with said arm, substantially as described.

43. In a registering-machine, the combination of a driving mechanism, two registers for registering different classes of sales, mounted in a movable frame and adapted to be independently connected with and actuated by the driving mechanism, a type-carrier bearing type indicating the different classes of sales and coöperating with the registers so that when one or the other of them is connected with the driving mechanism the type-carrier will be set to print a character indicating the class of sale to which such register belongs, and a platen actuated by the driving mechanism and coöperating with the type-carrier, substantially as described.

44. In a registering-machine, the combination of a driving mechanism, two registers for registering different classes of sales, mounted in a movable frame adapted to be shifted to connect either register with the driving mechanism at will, a type-carrier actuated by the register-frame and bearing type-characters representing the different classes of sales, and a platen coöperating with said carrier, substantially as described.

45. In a registering-machine, the combination of a driving mechanism, two registers for registering different classes of sales, mounted in a movable frame adapted to be shifted to connect either register with the driving mechanism at will, an indicator operated by the movable register-frame to indicate the class of sale being registered, a type-carrier also operated by the register-frame and bearing type-characters representing the different classes of sales, and a platen coöperating with said carrier, substantially as described.

46. In a registering-machine, the combination of a driving or operating mechanism, a plurality of registers for registering different classes of transactions, adapted to independently coöperate with the driving mechanism, means for controlling the coöperation of the several registers with the driving mechanism, printing devices for printing at each operation of the machine the amount added upon the register coöperating with the driving mechanism, and a special printing device for also printing at each operation of the machine a character indicating which register is actuated by the driving mechanism.

47. In a registering-machine, the combination of a driving or operating mechanism, a plurality of registers for registering different classes of transactions, adapted to independently coöperate with the driving mechanism, means for controlling the coöperation of the several registers with the driving mechanism, regular indicating devices for indicating at each operation of the machine the amount added upon the particular register actuated by the driving mechanism and special indicating devices for also indicating at each operation of the machine the particular register upon which such amount is added, and printing devices for printing at each operation of the machine the amount so added upon the register actuated by the driving mechanism.

48. In a registering-machine, the combination of a driving or operating mechanism, a plurality of registers for registering different classes of transactions, adapted to independently coöperate with the driving mechanism, means for controlling the coöperation of the several registers with the driving mechanism, regular indicating devices for indicating at each operation of the machine the amount added upon the particular register actuated by the driving mechanism and special indicating devices for also indicating at each operation of the machine the particular register upon which such amount is added, printing devices for printing at each operation of the machine the amount so added upon the register actuated by the driving mechanism, and a special printing device for also printing at each operation of the machine a character corresponding to the particular register upon which such amount is added.

49. In a registering-machine, the combination of a driving or operating mechanism, a plurality of registers for registering different classes of transactions, adapted to independently coöperate with the driving mechanism, a plurality of special keys controlling the coöperation of the several registers with the driving mechanism, and printing devices coöperating with such special keys and registers to print at each operation of the machine a character indicating which register coöperates with the driving mechanism.

50. In a registering-machine, the combination of a driving or operating mechanism, a plurality of registers for registering different classes of transactions, adapted to independently coöperate with the driving mechanism, a plurality of special keys controlling the coöperation of the several registers with the driving mechanism, special indicating devices coöperating with said keys and registers to indicate at each operation of the machine which register is actuated by the driving mechanism, and printing devices coöperating with such keys, registers and indicating devices to print at each operation of the machine a character corresponding to the register which is actuated by the driving mechanism.

51. In a registering-machine, the combination of a series of reciprocating segments, a series of sets of keys representing different denominations, one set coöperating with each segment to determine its different degrees of movement at the operations of different keys, a plurality of registers independently coöperating with said segments, means for determining at each operation of the machine which particular register shall coöperate with the segments, indicating devices for indicating at each operation of the machine the amount added upon the register coöperating with the segments, and printing devices for printing at each operation of the machine the amount added upon the register coöperating with the segments.

52. In a registering-machine, the combination of a series of reciprocating segments, a series of sets of keys representing different denominations, one set coöperating with each segment to determine its different degrees of movement at the operations of different keys, a plurality of registers independently coöperating with said segments, means for determining at each operation of the machine which particular register shall coöperate with the segments, indicating devices for indicating at each operation of the machine the amount added upon the register coöperating with the segments, printing devices for printing at each operation of the machine the amount so added upon the register coöperating with the segments, and a special printing device for also printing at each operation a character corresponding to the register coöperating with the segments.

53. In a registering-machine, the combination of a series of reciprocating segments, a series of sets of keys representing different denominations, one set coöperating with each segment to determine its different degrees of movement at the operations of different keys, a plurality of registers independently coöperating with such segments, means for determining at each operation of the machine which register shall coöperate with the segments, indicating devices for indicating the amount registered at each operation of the machine and special indicating devices for indicating the particular register upon which such amount is registered, printing devices for printing the amount registered at each operation of the machine, and a special printing device for also printing at each operation a character corresponding to the particular register upon which such amount is registered.

54. In a registering-machine, the combination of a series of reciprocating segments hung upon a common shaft or axis, a series of sets of keys, arranged radially to said shaft and representing different denominations, each set consisting of a single row of nine keys representing the nine digits (or multiples thereof by ten), and one of said sets coöperating with each segment to determine the different degrees of movement of said segment at the operations of different keys in its set, a plurality of registers independently coöperating with the segments, means for determining at each operation of the machine which particular register shall coöperate with the segments, and printing devices for printing at each operation of the machine the amount added upon the register so coöperating with the segments.

55. In a registering-machine, the combination of a series of reciprocating segments hung upon a common shaft or axis, a series of sets of keys arranged radially to said shaft and representing different denominations, each set consisting of a single row of nine keys representing the nine digits (or multiples thereof by ten), and one of said sets coöperating with each segment to determine the different degrees of movement of said segment at the operations of different keys in its set, a plurality of registers independently coöperating with the segments, means for determining at each operation of the machine which particular register shall coöperate with the segments, printing devices for printing at each operation of the machine the amount added upon the register so coöperating with the segments, and a special printing device for also printing at each operation a character corresponding to the particular register upon which such amount is added.

56. In a registering-machine, the combination of a series of reciprocating segments hung upon a common shaft or axis, a series of sets of keys arranged radially to said shaft and representing different denominations, each set consisting of a single row of nine keys representing the nine digits (or multiples thereof by ten), and one of said sets coöperating with each segment to determine the different degrees of movement of said segment at the operations of different keys in its set, a plurality of rotary indicator-wheels coöperating with the segments to indicate the amounts registered, a plurality of registers independently coöperating with the segments, means for determining at each operation of the machine which particular register shall coöperate with the segments, special indicating devices for indicating at each operation of the machine the particular register so coöperating with the segments, and printing devices for printing at each operation of the machine the amount added upon the register coöperating with the segments.

57. In a registering-machine, the combination of a series of reciprocating segments hung upon a common shaft or axis, a series of sets of keys arranged radially to said shaft and representing different denominations, each set consisting of a single row of nine keys representing the nine digits (or multiples thereof by ten), and one of said sets coöperating with each segment to determine the different degrees of movement of said segment at the operations of different keys in its set, a plurality of rotary indicator-wheels coöperating with the segments to indicate the amounts registered, a plurality of registers independently coöperating with the segments, means for determining at each operation of the machine which particular register shall coöperate with the segments, special indicating devices for indicating at each operation of the machine the particular register so coöperating with the segments, printing devices for printing at each operation of the machine the amount added upon the register coöperating with the segments, and a special printing device for also printing at each operation a character corresponding to such register.

JOSEPH P. CLEAL.

Witnesses:
PEARL N. SIGLER,
JOHN M. BUCKLES.